United States Patent
Hu et al.

(10) Patent No.: US 12,413,465 B2
(45) Date of Patent: Sep. 9, 2025

(54) COMMUNICATION METHOD AND APPARATUS

(71) Applicant: HUAWEI TECHNOLOGIES CO., LTD., Guangdong (CN)

(72) Inventors: Yuanzhou Hu, Shanghai (CN); Qi Feng, Shanghai (CN); Huang Huang, Shenzhen (CN); Xiaoyan Bi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 18 days.

(21) Appl. No.: 18/621,237

(22) Filed: Mar. 29, 2024

(65) Prior Publication Data
US 2024/0243959 A1    Jul. 18, 2024

Related U.S. Application Data

(63) Continuation of application No. PCT/CN2022/117118, filed on Sep. 5, 2022.

(30) Foreign Application Priority Data
Sep. 30, 2021   (CN) .......................... 202111165964.8

(51) Int. Cl.
H04L 27/26  (2006.01)
H04L 5/00   (2006.01)

(52) U.S. Cl.
CPC ........ H04L 27/2666 (2013.01); H04L 5/0092 (2013.01); H04L 27/2678 (2013.01)

(58) Field of Classification Search
CPC .............. H04L 5/0092; H04L 27/2666; H04L 27/2678
See application file for complete search history.

(56) References Cited

U.S. PATENT DOCUMENTS

2020/0092065 A1*   3/2020  Kuang ................ H04L 27/2666

FOREIGN PATENT DOCUMENTS

| CN | 108023701 A | 5/2018 |
|---|---|---|
| CN | 111885726 A | 11/2020 |

OTHER PUBLICATIONS

3GPP TSG RAN WG1 Meeting #86bis, "Subcarrier spacing design for data and reference signal", OPPO, R1-1608900, Lisbon, Portugal, Oct. 10-14, 2016, total 7 pages.
International Search Report and Written Opinion issued in PCT/CN2022/117118, dated Dec. 6, 2022, 10 pages.

* cited by examiner

Primary Examiner — Rahel Guarino

(57) ABSTRACT

This application relates to the field of communication technologies, and provides a communication method and apparatus, to improve demodulation performance. A first subcarrier spacing, a second subcarrier spacing, a cyclic prefix (CP) length of a first symbol, and a CP length of a second symbol are determined, where the first subcarrier spacing is K times the second subcarrier spacing, K is an integer greater than 1, and the CP length of the first symbol is greater than or equal to the CP length of the second symbol.

20 Claims, 4 Drawing Sheets

Step 201
Determine a first subcarrier spacing, a second subcarrier spacing, a cyclic prefix CP length of a first symbol, and a CP length of a second symbol, where the first subcarrier spacing is K times the second subcarrier spacing, K is an integer greater than 1, and the CP length of the first symbol is greater than or equal to the CP length of the second symbol Step 202
A first device sends a reference signal based on the CP length of the first symbol and the first subcarrier spacing, and sends data based on the CP length of the second symbol and the second subcarrier spacing; or the first device sends a reference signal based on the CP length of the second symbol and the first subcarrier spacing, and sends data based on the CP length of the second symbol, the CP length of the first symbol and the second subcarrier spacing

COMMUNICATION METHOD AND APPARATUS

CROSS-REFERENCE TO RELATED APPLICATIONS

This application is a continuation of International Application No. PCT/CN2022/117118, filed on Sep. 5, 2022, which claims priority to Chinese Patent Application No. 202111165964.8, filed on Sep. 30, 2021. The disclosures of the aforementioned applications are hereby incorporated by reference in their entireties.

TECHNICAL FIELD

Embodiments of this application relate to the fields of communication and the like, and in particular, to a communication method and apparatus.

BACKGROUND

In a communication system, a sending device generally sends data and a reference signal to a receiving device. The receiving device may perform processing such as channel estimation and equalization by using the reference signal and received data, to obtain data for sending. Generally, data transmission can be better performed only after the reference signal is successfully demodulated.

In a communication process, improving demodulation performance is a common problem.

SUMMARY

Embodiments of this application provide a communication method and apparatus, to improve demodulation performance.

According to a first aspect, a communication method is provided. The method may be executed by a first device, or may be a component applied to a first device, for example, a chip or a processor. The first device may be a terminal device, or may be a network device. The following provides descriptions by using an example in which an execution body is a first device. The first device determines a first subcarrier spacing, a second subcarrier spacing, a cyclic prefix (CP) length of a first symbol, and a CP length of a second symbol, where the first subcarrier spacing is K times the second subcarrier spacing, K is an integer greater than 1, and the CP length of the first symbol is greater than or equal to the CP length of the second symbol. Then, the first device sends a reference signal based on the CP length of the first symbol and the first subcarrier spacing, and sends data based on the CP length of the second symbol and the second subcarrier spacing; or sends a reference signal based on the CP length of the second symbol and the first subcarrier spacing, and sends data based on the CP length of the first symbol, the CP length of the second symbol, and the second subcarrier spacing.

A CP length of a symbol on which the reference signal is sent is greater than or equal to a CP length of a symbol on which the data is sent, so that inter-symbol interference can be reduced or avoided, and demodulation performance can be improved.

In a possible implementation, the determining a first subcarrier spacing, a second subcarrier spacing, a cyclic prefix (CP) length of a first symbol, and a CP length of a second symbol includes: selecting a first correspondence from a table, where the table includes a plurality of correspondences of parameter information, and parameter information in any correspondence includes a ratio K of the first subcarrier spacing to the second subcarrier spacing, the CP length of the first symbol in a reference time unit, and the CP length of the second symbol in the reference time unit; and for any correspondence, K is an integer greater than 1, and the CP length of the first symbol is greater than or equal to the CP length of the second symbol. Selection is performed from the plurality of correspondences, so that flexibility of selection can be improved.

In a possible implementation, the parameter information in any correspondence may further include a quantity M1 of symbols corresponding to the first subcarrier spacing in the reference time unit, and a quantity M2 of symbols corresponding to the second subcarrier spacing in the reference time unit.

In a possible implementation, for any correspondence, the quantity M1 of symbols corresponding to the first subcarrier spacing is less than or equal to the quantity M2 of symbols corresponding to the second subcarrier spacing. When a CP length of a 1' symbol is greater than a CP length of a remaining symbol, because the reference signal is generally sent before a data signal, it can be ensured to some extent that a CP length of the reference signal is greater than a CP length of the data symbol. Therefore, inter-symbol interference can be avoided to some extent.

In a possible implementation, for at least one value of K, the table includes at least two correspondences.

In a possible implementation, when $$T_{unit,ref} = \frac{7.5}{\Delta f_2} \cdot \tau$$

and $N_2 = 2048 \cdot \rho$, $T_{unit,ref}$ is a duration of the reference time unit, $\Delta f_2$ is the second subcarrier spacing, $N_2$ is a length of a symbol corresponding to the second subcarrier spacing, both ti and p are greater than 0, and the plurality of correspondences may include at least one of the following:

when K=2, M1=2τ, and M2=6τ, CP lengths of the first symbol and the second symbol are 128ρ;
when K=2, M1=3τ, and M2=5τ, CP lengths of the first symbol and the second symbol are 256ρ;
when K=2, M1=4τ, and M2=4τ, CP lengths of the first symbol and the second symbol are 384ρ;
when K=4, M1=2τ, and M2=6τ, CP lengths of the first symbol and the second symbol are 256ρ;
when K=4, M1=5τ, and M2=5τ, CP lengths of the first symbol and the second symbol are 256ρ;
when K=8, M1=2τ, and M2=6τ, CP lengths of the first symbol and the second symbol are 320ρ;
when K=8, M1=3τ, and M2=6τ, CP lengths of the first symbol and the second symbol are 256ρ; and
when K=8, M1=6τ, and M2=6τ, CP lengths of the first symbol and the second symbol are 128ρ.

In a possible implementation, when $$T_{unit,ref} = \frac{7.5}{\Delta f_2} \cdot \tau$$

and $N_2 = 2048 \cdot \rho$, $T_{unit,ref}$ is a duration of the reference time unit, $\Delta f_2$ is the second subcarrier spacing, $N_2$ is a length of a symbol corresponding to the second subcarrier spacing, both τ and ρ are greater than 0, and the plurality of correspondences may include at least one of the following:

when K=2, M1=4τ, and M2=5τ, the CP length of the first symbol is 128ρ and the CP length of the second symbol is 112ρ;

when K=4, M1=3τ, and M2=6τ, the CP length of the first symbol is 256ρ and the CP length of the second symbol is 160ρ;

when K=4, M1=3τ, and M2=6τ, the CP length of the first symbol is 192ρ and the CP length of the second symbol is 168ρ;

when K=4, M1=4τ, and M2=6τ, the CP length of the first symbol is 160ρ and the CP length of the second symbol is 96ρ;

when K=4, M1=4τ, and M2=6τ, the CP length of the first symbol is 124ρ and the CP length of the second symbol is 100ρ;

when K=8, M1=4τ, and M2=6τ, the CP length of the first symbol is 248ρ and the CP length of the second symbol is 200ρ; and when K=8, M1=4τ, and M2=6τ, the CP length of the first symbol is 212ρ and the CP length of the second symbol is 204ρ.

In a possible implementation, when $$T_{unit,ref} = \frac{7.5}{\Delta f_2} \cdot \tau.$$

and $N_2=2048 \cdot \rho$, $T_{unit,ref}$ is a duration of the reference time unit, $\Delta f_2$ is the second subcarrier spacing, $N_2$ is a length of a symbol corresponding to the second subcarrier spacing, all ti, p and ρ are greater than 0, and the plurality of correspondences may include at least one of the following:

when K=2, M1=2τ, and M2=6τ, the CP length of the first symbol is 176ρ and the CP length of the second symbol is 112ρ;

when K=2, M1=2τ, and M2=6τ, the CP length of the first symbol is 152ρ and the CP length of the second symbol is 120p;

when K=2, M1=4τ, and M2=5τ, the CP length of the first symbol is 136ρ and the CP length of the second symbol is 96ρ;

when K=2, M1=4τ, and M2=5τ, the CP length of the first symbol is 116ρ and the CP length of the second symbol is 112ρ;

when K=4, M1=3τ, and M2=6τ, the CP length of the first symbol is 192ρ and the CP length of the second symbol is 160ρ;

when K=4, M1=4τ, and M2=6τ, the CP length of the first symbol is 112ρ and the CP length of the second symbol is 96ρ;

when K=8, M1=4τ, and M2=6τ, the CP length of the first symbol is 224ρ and the CP length of the second symbol is 192ρ; and when K=8, M1=6τ, and M2=6τ, the CP length of the first symbol is 144ρ and the CP length of the second symbol is 112ρ.

In a possible implementation, the first device may further send data based on the first subcarrier spacing.

In a possible implementation, when the reference signal is sent based on the CP length of the first symbol and the first subcarrier spacing, and the data is sent based on the CP length of the second symbol and the second subcarrier spacing, the reference signal may be further sent based on the CP length of the second symbol and the first subcarrier spacing.

In a possible implementation, the first symbol is a $1^{st}$ symbol in the reference time unit, and the second symbol is a remaining symbol in the reference time unit other than the $1^{st}$ symbol; or the first symbol is a symbol corresponding to the first subcarrier spacing, and the second symbol is a symbol corresponding to the second subcarrier spacing.

In a possible implementation, the first device may further receive indication information, where the indication information indicates the first correspondence. This case is usually applicable to a case in which the first device is a terminal device. The first device selects a correspondence based on an indication of a network device, so that communication performance can be improved.

According to a second aspect, a communication apparatus is provided, and the apparatus has a function of implementing any one of the first aspect and the possible implementations of the first aspect. These functions may be implemented by hardware, or may be implemented by hardware by executing corresponding software. The hardware or software includes one or more functional modules corresponding to the foregoing function.

According to a third aspect, a communication apparatus is provided, including a processor, and optionally, further including a memory. The processor is coupled to the memory. The memory stores a computer program or instructions. The processor is configured to execute a part or all of the computer programs or instructions in the memory, and when the part or all of the computer programs or instructions are executed, is configured to implement a function of a first device in the method according to any one of the first aspect or the possible implementations of the first aspect.

In a possible implementation, the apparatus may further include a transceiver, and the transceiver is configured to transmit a signal processed by the processor, or receive a signal input into the processor. The transceiver may perform a sending action or a receiving action performed by the first device in any one of the first aspect and the possible implementations of the first aspect.

According to a fourth aspect, this application provides a chip system. The chip system includes one or more processors (also referred to as processing circuits). The processor is electrically coupled to a memory (also referred to as a storage medium). The memory may be located in the chip system, or may not be located in the chip system. The memory stores computer programs or instructions. The processor is configured to: execute a part or all of the computer programs or instructions in the memory; and when the part or all of the computer programs or instructions are executed, is configured to implement a function of a first device in the method according to any one of the first aspect and the possible implementations of the first aspect.

In a possible implementation, the chip system may further include an input/output interface (which may also be referred to as a communication interface). The input/output interface is configured to output a signal processed by the processor, or receive a signal input to the processor. The input/output interface may perform a sending action or a receiving action performed by the first device in any one of the first aspect and the possible implementations of the first aspect. Specifically, the output interface performs a transmitting action, and the input interface performs a receiving action.

In a possible implementation, the chip system may include a chip, or may include a chip and another discrete device.

According to a fifth aspect, a computer-readable storage medium is provided. The computer-readable storage medium is configured to store a computer program. The computer program includes instructions used to implement the function according to any one of the first aspect or the possible implementations of the first aspect.

Alternatively, a computer-readable storage medium is configured to store a computer program. When the computer program is executed by a computer, the computer may be enabled to perform the method performed by a first device in the method in any one of the first aspect or the possible implementations of the first aspect.

According to a sixth aspect, a computer program product is provided. The computer program product includes computer program code. When the computer program code is run on a computer, the computer is enabled to perform the method performed by a first device in any one of the first aspect and possible implementations of the first aspect.

For technical effects that can be achieved in any one of the second aspect to the sixth aspect, refer to descriptions of technical effects that can be achieved in any possible implementation solution of the first aspect.

DESCRIPTION OF EMBODIMENTS

To facilitate understanding of technical solutions in embodiments of this application, the following briefly describes a system architecture of a method provided in embodiments of this application. It may be understood that the system architecture described in embodiments of this application is intended to describe the technical solutions in embodiments of this application more clearly, and do not constitute any limitation on the technical solutions provided in embodiments of this application.

The technical solutions in embodiments of this application may be applied to various communication systems, for example, a satellite communication system and a conventional mobile communication system. The satellite communication system may be integrated with the conventional mobile communication system (that is, a terrestrial communication system). For example, the communication system is a wireless local area network (WLAN) communication system, a wireless fidelity (Wi-Fi) system, a long term evolution (LTE) system, an LTE frequency division duplex (FDD) system, an LTE time division duplex (TDD) system, a 5th generation (5G) system or a new radio (NR) system, a 6th generation (6G) system, or another future communication system. The communication system further supports a communication system integrating a plurality of wireless technologies, for example, may also be applied to a system that integrates a non-terrestrial network (NTN) and a ground mobile communication network, like an uncrewed aerial vehicle, a satellite communication system, and high altitude platform station (HAPS) communication.

Figure 1:
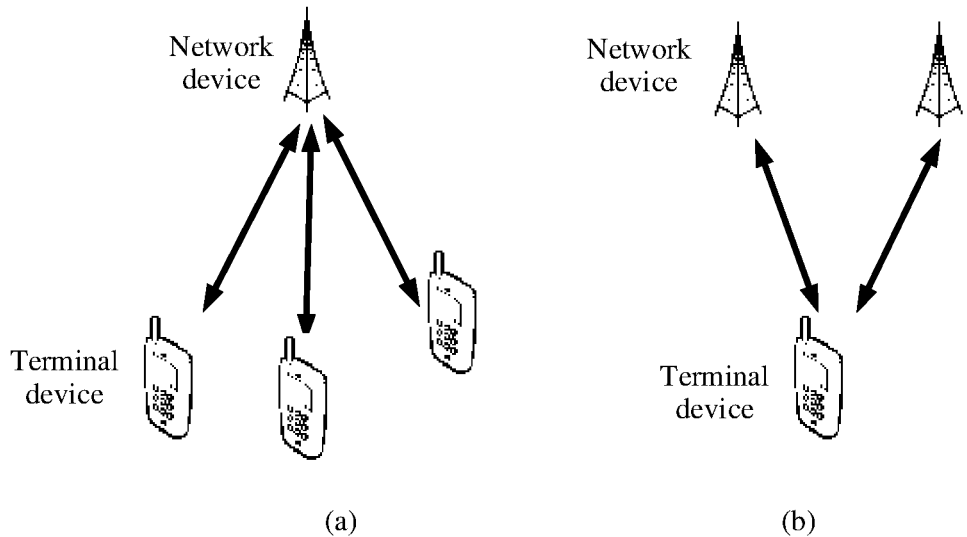
FIG. 1 is a schematic diagram of an architecture of an example communication system according to an embodiment of this application.

FIG. 1 is an example of an example communication system applicable to an embodiment of this application. Refer to FIG. 1. The communication system includes at least one network device and at least one terminal. A single network device may transmit data or control signaling (for example (a)) to a single terminal device or a plurality of terminal devices. Alternatively, a plurality of network devices may simultaneously transmit data or control signaling (for example (b)) to a single terminal device.

The network device in this application may be an evolved NodeB (eNB or eNodeB) in LTE, or a base station in a 5G network, a broadband network gateway (BNG), an aggregation switch, or a non-3$^{rd}$ generation partnership project (3GPP) access device, and the like. This is not specifically limited in embodiments of this application. Optionally, the base station in embodiments of this application may include various forms of base stations, for example, a macro base station, a micro base station (also referred to as a small cell), a relay station, an access point, a next-generation base station (gNodeB, gNB), a transmission reception point (TRP), a transmission point (TP), a mobile switching center and device-to-device (D2D), vehicle-to-everything (V2X), machine-to-machine (M2M) communication, and a device that functions as a base station in internet of things communication, or the like. This is not specifically limited in embodiments of this application.

The network device may communicate and interact with a core network device, to provide a communication service for the terminal device. The core network device is, for example, a device in a core network (CN) of a 5G network. As a bearer network, the core network provides an interface to a data network, provides communication connection, authentication, management, and policy control for user equipment (UE), bears data services, and the like.

The terminal mentioned in embodiments of this application may be a device having a wireless transceiver function, and may be specifically user equipment (UE), an access terminal, a subscriber unit, a subscriber station, a mobile station, a remote station, a remote terminal, a mobile device, a user terminal, a wireless communication device, a user agent, or a user apparatus. Alternatively, the terminal device may be a satellite phone, a cellular phone, a smartphone, a wireless data card, a wireless modem, a machine type communication device, a cordless phone, a session initiation protocol (SIP) phone, a wireless local loop (WLL) station, a personal digital assistant (PDA), a handheld device with a wireless communication function, a computing device, another processing device connected to a wireless modem, a vehicle-mounted device, a communication device carried on a high-altitude aircraft, a wearable device, an uncrewed aerial vehicle, a robot, a terminal in device-to-device (D2D) communication, a terminal in vehicle to everything (V2X), a virtual reality (VR) terminal device, an augmented reality (AR) terminal device, a wireless terminal in industrial control (industrial control), a wireless terminal in self driving, a wireless terminal in remote medical, a wireless terminal in a smart grid, a wireless terminal in transportation safety (transportation safety), a wireless terminal in a smart city, a wireless terminal in a smart home, a terminal device in a future communication network, or the like. This is not limited in this application.

For ease of understanding embodiments of this application, the following describes an application scenario of this application. A network architecture and a service scenario described in embodiments of this application are intended to describe the technical solutions in embodiments of this application more clearly, and do not constitute any limitation on the technical solutions provided in embodiments of this application. A person of ordinary skill in the art may know that, as a new service scenario emerges, the technical solutions provided in embodiments of this application are also applicable to a similar technical problem.

In an NR (new radio) system, a time granularity $T_c=1/(\Delta f_{max} \cdot N_f)$ is defined by using a $3^{rd}$ generation partnership project (3GPP) TS38.211 V16.3.0 protocol as an example, where $\Delta f_{max}=480 \cdot 10^3$ Hz, and $$N_f = 4096. \kappa = \frac{T_s}{T_c} = 64$$

is defined, where $T_s=1/(\Delta f_{ref} \cdot N_{f,ref})$, $\Delta f_{ref}=15 \cdot 10^3$ Hz, and $N_{f,ref}=2048$.

In the NR system, subcarrier spacings $\Delta_f$ (unit: kHz) correspond to parameters μ in a one-to-one manner, where $\Delta_f=2^\mu \cdot 15$. Values of the parameters μ range from 0 to 4, and values of corresponding subcarrier spacings $\Delta_f$ are 15 kHz, 30 kHz, 60 kHz, 120 kHz, and 240 kHz.

For example, in section 5.3.1 in the 3GPP TS 38.211 V16.3.0 protocol, in an orthogonal frequency division multiplexing (OFDM) symbol generated in the NR system, a length of the OFDM symbol (the length of the symbol may also be understood as a quantity of discrete data included in the symbol) is $N_u^\mu=2048\kappa \cdot 2^{-\mu}$. For example, if a normal cyclic prefix (normal CP) is used, a CP length is as follows:

$$N_{CP,l}^\mu = \begin{cases} 144\kappa \cdot 2^{-\mu} + 16\kappa & l = 0 \text{ or } l = 7 \cdot 2^\mu \\ 144\kappa \cdot 2^{-\mu} & l \neq 0 \text{ and } l \neq 7 \cdot 2^\mu \end{cases}$$

Herein, l is an index of the symbol, and a duration of the OFDM symbol is $(N_u^\mu+N_{CP,l}^\mu)T_c$, namely, $(N_u^\mu+N_{CP,l}^\mu)T_s/K$.

For example, μ=0, that is, the subcarrier spacing is 15 kHz. In this case, the length of the OFDM symbol is $N_u^\mu=2048\kappa$ and the CP length is as follows:

$$N_{CP,l}^0 = \begin{cases} 160\kappa & l = 0 \text{ or } l = 14 \\ 144\kappa & l \neq 0 \text{ and } l \neq 14 \end{cases}$$

In a process of generating the OFDM symbol, a discrete OFDM symbol may be first generated through inverse discrete Fourier transform. The discrete OFDM symbol includes $N_u^\mu=2048\kappa$ discrete data, and a time interval between two pieces of adjacent discrete data is $T_c$. Continuous OFDM symbols may be obtained by performing processing such as upsampling and up-conversion on the discrete OFDM symbols.

According to the foregoing descriptions and with reference to section 4.3.2 in the 3GPP TS 38.211 V16.3.0 protocol, the following may be obtained.

As shown in the following Table A, a possible correspondence among CP lengths, symbol lengths, and symbol quantities at different subcarrier spacings in 0.5 ms when a system bandwidth is 20 MHz is described.

TABLE A

| System bandwidth | Subcarrier spacing | Length: $1^{st}$ CP within 0.5 ms | Length: Other CP within 0.5 ms | Symbol length | Symbol quantity |
|---|---|---|---|---|---|
| 20 MHz | 15 kHz | 160 | 144 | 2048 | 7 |
|  | 30 kHz | 88 | 72 | 1024 | 14 |
|  | 60 kHz | 52 | 36 | 512 | 28 |
|  | 120 kHz | 34 | 18 | 256 | 56 |
|  | 240 kHz | 25 | 9 | 128 | 112 |

Generally, a bandwidth of a reference signal sent by the terminal device is consistent with a bandwidth of sent data, and the bandwidth of the sent data is less than the system bandwidth.

The duration of one subframe is 1 ms. The terminal device may send data by using a part of or all symbols of one subframe, or the terminal device may send data by using all symbols of a plurality of subframes, where the plurality of subframes may be a repetition of one subframe.

It should be noted that the foregoing value of the length is a discrete value, and the duration of the symbol may be a length*$T_s$ or a length κ·$T_c$, where $T_s=1/f_s$, and $f_s$ is 30.72 MHz. For example, A discrete values may be obtained by performing sampling on a symbol whose duration is A*$T_s$ at each interval $T_s$. $T_s$ may be referred to as a sampling time interval, and $f_s$ may be referred to as a sampling rate. It may be understood that the duration of the symbol multiplied by the sampling rate is equal to the symbol length.

For example, when the system bandwidth of the terminal device is 10 MHz, the terminal device may generate a symbol and a CP based on a symbol length 2048, $T_s=1/f_s$, and $f_s$ is 30.72 MHz when the system bandwidth is 20 MHz. However, a bandwidth occupied by the generated symbol is only within a 10 MHz bandwidth in the 20 MHz bandwidth. However, the complexity of generating the symbol and the CP is high. In this case, when the system bandwidth is 20 MHz, the terminal device may reduce the symbol length 2048, the CP length, and $f_s$ to two times proportionally, that is, the symbol length is 1024, the CP length is 80 or 72, and $f_s$ is 15.36 MHz. In this way, the complexity of generating the symbol and the CP can be reduced.

In the case of a same system bandwidth, when the subcarrier spacing is reduced (or increased) proportionally, the symbol length may be increased (or reduced) proportionally, or $f_s$ may remain unchanged, and a corresponding CP length may also be increased (or reduced) proportionally.

In a communication system, a sending device sends data and a reference signal to a receiving device. The receiving device may perform processing such as channel estimation and equalization by using the reference signal and received data, to obtain data for sending. For ease of description, a symbol on which the reference signal is located (namely, a symbol used to carry the reference signal) is referred to as a reference signal symbol, and a symbol on which the data is located (namely, a symbol used to carry the data) is referred to as a data symbol.

As a carrier frequency increases and a movement speed of the terminal device increases, a doppler shift improves significantly. In this case, a channel response changes rapidly. To track a rapid change of a channel in time, the sending device needs to increase time domain density for sending a reference signal, that is, send the reference signal by using more symbols. In this case, the overheads of the reference signal are large, and spectral efficiency of the data is reduced.

To reduce overheads of the reference signal, a possible method is to send a reference signal and data by using different subcarrier spacings, so that a length (or duration) of the reference signal symbol is less than a length (or duration) of the data symbol. For example, a subcarrier spacing of the reference signal symbol is K times a subcarrier spacing of the data symbol, and the length of a corresponding reference signal symbol is reduced proportionally to 1/K of the length of the data symbol, where K is an integer greater than 1. In this way, the overheads of the reference signal can be reduced and the overheads of the reference signal can be flexibly adjusted.

It can be learned from Table A that when the subcarrier spacing is increased to two times an original subcarrier spacing, in a same system bandwidth, the length or duration of a corresponding symbol is reduced to ½ of the original, and a length or duration of a corresponding CP is also reduced to ½ of the original. Based on this, it can be learned that when the subcarrier spacing of the reference signal symbol is K times the subcarrier spacing of the data symbol, the length or duration of the corresponding reference signal symbol is reduced proportionally to 1/K of the length of the data symbol, and the CP length or duration of the reference signal symbol is also reduced proportionally to 1/K of the CP length of the data symbol.

When the subcarrier spacing of the reference signal symbol is inconsistent with the subcarrier spacing of the data symbol, the overheads of the reference signal can be reduced and flexibly adjusted. However, the CP length of the reference signal symbol is less than the CP length of the data symbol. After a multipath channel is passed, inter-symbol interference may be introduced, and demodulation performance is reduced.

Based on this, this application provides a solution, so that the CP length of the reference signal symbol can be greater than or equal to the CP length of the data symbol, to avoid inter-symbol interference.

A plurality of names in this application are first described.

(1) A first subcarrier spacing and a second subcarrier spacing are used to send a reference signal and data. For example, the first subcarrier spacing is used to send a reference signal, and the second subcarrier spacing is used to send data. For example, the first subcarrier spacing is used to send a reference signal and data, and the second subcarrier spacing is used to send data. Values of the second subcarrier spacing may be all or some of 3.75 kHz, 7.5 kHz, 15 kHz, 30 kHz, 60 kHz, 120 kHz, and 240 kHz. Values of the second subcarrier spacing may alternatively be all or some of 4.375 kHz, 8.75 kHz, 17.5 kHz, 35 kHz, 70 kHz, 140 kHz, and 280 kHz. The plurality of values may alternatively form a value set.

The first subcarrier spacing is denoted as $\Delta f_1$ kHz, the second subcarrier spacing is denoted as $\alpha f_2$ kHz, and they meet $\Delta f_1/\Delta f_2=K$, where K is an integer greater than 1, for example, K is an even number, for example, 2, 4, 6, 8, 10, 12, 16, or 32. Duration of a symbol corresponding to the first subcarrier spacing is $1/\Delta f_1$, and duration of a symbol corresponding to the second subcarrier spacing is $1/\Delta f_2$.

In a reference time unit, a quantity of symbols corresponding to the first subcarrier spacing is M1. In the reference time unit, a quantity of symbols corresponding to the second subcarrier spacing is M2. Both M1 and M2 are integers greater than or equal to 1.

(2) Reference time unit: The reference time unit may be a half slot, one slot, two slots, or the like. Duration of the reference time unit is denoted as $T_{unit,ref}$. There is a correspondence between the duration of the reference time unit and the second subcarrier spacing. Specifically, $T_{unit,ref}$ may be determined based on the second subcarrier spacing. For example, the relationship between the duration of the reference time unit and the second subcarrier spacing may be represented as follows:

$$T_{unit,ref} = \frac{7.5}{\Delta f_2} \cdot \tau,$$

Values of the second subcarrier spacing are all or some of 3.75 kHz, 7.5 kHz, 15 kHz, 30 kHz, 60 kHz, 120 kHz, and 240 kHz.

$\tau$ may be a predefined value, for example, i may be a positive integer, for example, a value like 1 or 2.

For example, the relationship between the duration of the reference time unit and the second subcarrier spacing may alternatively be represented as follows:

$$T_{unit,ref} = \frac{8.75}{\Delta f_2} \cdot \tau.$$

Values of the second subcarrier spacing are all or some of 4.375 kHz, 8.75 kHz, 17.5 kHz, 35 kHz, 70 kHz, 140 kHz, and 280 kHz.

(3) A length of the symbol corresponding to the second subcarrier spacing may be predefined as $N_2=2048 \cdot \rho$, where $\rho$ is a predefined value, for example, $\rho$ is ¼, ½, 1, or 2. Correspondingly, a length of the symbol corresponding to the first subcarrier spacing is $N_1=N_2/K$. It may be learned that a sampling frequency of the second subcarrier spacing may be $f_2=\Delta f_2 \cdot N_2$, and a sampling time interval is $T_2=1/f_2$; and a sampling frequency of the first subcarrier spacing may be $f_1=\Delta f_1 \cdot N_1=f_2$; and a sampling time interval is $T_1=T_2$. It may be understood that, $N_2$ discrete data may be obtained by performing sampling on the symbol of the second subcarrier spacing at a sampling time interval $T_2$, and $N_1$ discrete data may be obtained by performing sampling on the symbol of the first subcarrier spacing at the sampling time interval $T_2$.

(4) The CP length includes a CP length of a first symbol and a CP length of a second symbol. The CP length of the first symbol may also be referred to as a first CP length, and the CP length of the second symbol may also be referred to as a second CP length.

In an example, in the two types of symbols, namely, the first symbol and the second symbol, one type of symbol is the $1^{st}$ symbol in the reference time unit, and the other type of symbol is a remaining symbol in the reference time unit. To be specific, in the two types of CP lengths, namely, the first CP length and the second CP length, one type of CP length is a CP length of the $1^{st}$ symbol in the reference time unit, and the other type of CP length is a CP length of the remaining symbol in the reference time unit. The two types of CP lengths are the same or different.

In another example, in the two types of symbols, namely, the first symbol and the second symbol, one type of symbol is a symbol corresponding to the first subcarrier spacing, and the other type of symbol is a symbol corresponding to the second subcarrier spacing. To be specific, in the two types of CP lengths, namely, the first CP length and the second CP length, one type of CP length is a CP length of the symbol corresponding to the first subcarrier spacing, and the other type of CP length is a CP length of the symbol corresponding to the second subcarrier spacing. The two types of CP lengths are the same or different.

This application may be applicable to an uplink wireless communication system or a downlink wireless communication system. When this application is applicable to the uplink wireless communication system, a first device is a terminal device. When this application is applicable to the downlink wireless communication system, a first device is a network device.

Figure 2:
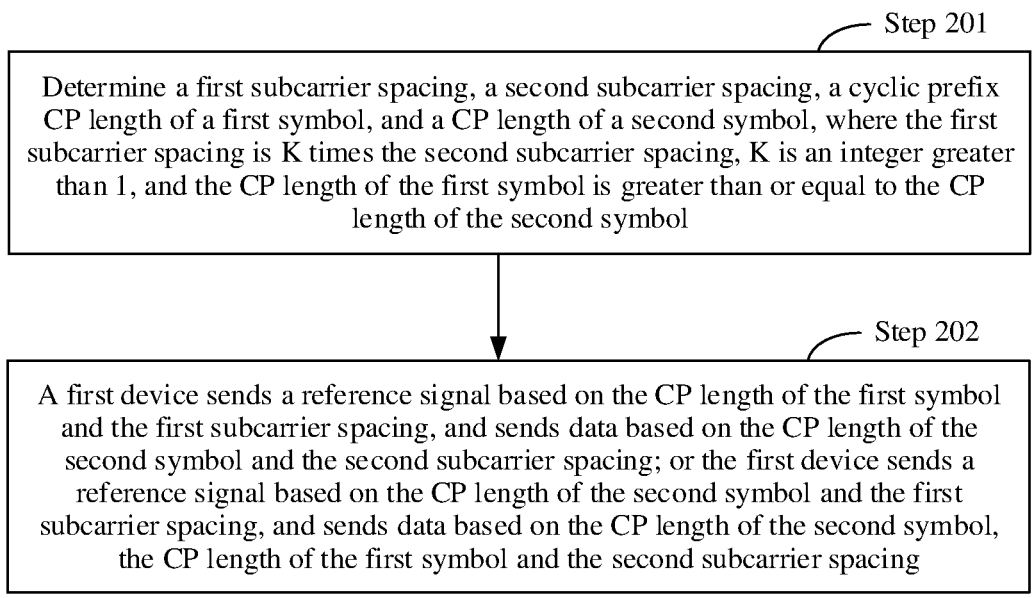
FIG. 2 is a schematic flowchart of an example communication method according to an embodiment of this application.

As shown in FIG. 2, an example communication method is provided, including at least the following steps.

Step 201: A first device determines a first subcarrier spacing, a second subcarrier spacing, a cyclic prefix (CP) length of a first symbol, and a CP length of a second symbol, where the first subcarrier spacing is K times the second subcarrier spacing, K is an integer greater than 1, and the CP length of the first symbol is greater than or equal to the CP length of the second symbol.

Step 202: The first device sends a reference signal based on the CP length of the first symbol and the first subcarrier spacing, and sends data based on the CP length of the second symbol and the second subcarrier spacing. Alternatively, the first device sends a reference signal based on the CP length of the second symbol and the first subcarrier spacing, and sends data based on the CP length of the second symbol, the CP length of the first symbol and the second subcarrier spacing.

A CP length of a symbol on which the reference signal is sent is greater than or equal to a CP length of a symbol on which the data is sent, so that inter-symbol interference can be reduced or avoided, and demodulation performance can be improved.

In an example, the first subcarrier spacing is used to send a reference signal, and the second subcarrier spacing is used to send data. In other words, a terminal device sends the reference signal on a symbol corresponding to the first subcarrier spacing, and sends the data on a symbol corresponding to the second subcarrier spacing. To further avoid resource waste, when a quantity of symbols corresponding to the first subcarrier spacing is greater than 1, the terminal device may send the reference signal on some symbols corresponding to the first subcarrier spacing, send the data on a remaining symbol corresponding to the first subcarrier spacing, and send the data on the symbol corresponding to the second subcarrier spacing. That is, in addition to sending the reference signal based on the first subcarrier spacing, the first device may further send the data based on the first subcarrier spacing.

Optionally, when the reference signal is sent based on the CP length of the first symbol and the first subcarrier spacing, and the data is sent based on the CP length of the second symbol and the second subcarrier spacing, the reference signal may alternatively be sent based on the CP length of the second symbol and the first subcarrier spacing.

In an optional example, the first symbol is a $1^{st}$ symbol in a reference time unit and the second symbol is a remaining symbol in the reference time unit other than the $1^{st}$ symbol. That is, a CP length of the $1^{st}$ symbol is greater than or equal to a CP length of the remaining symbol.

Alternatively, the first symbol is the symbol corresponding to the first subcarrier spacing, and the second symbol is the symbol corresponding to the second subcarrier spacing.

In an example, the first device sends the reference signal on the $1^{st}$ symbol, and sends the data on the remaining symbol.

In an example, the first device sends the reference signal on the $1^{st}$ symbol, sends the data on some symbols of the remaining symbols, and sends reference signals on some symbols of the remaining symbols.

In an example, the first device sends the data on the $1^{st}$ symbol, sends the data on some symbols of the remaining symbols, and sends the reference signals on some symbols of the remaining symbols.

In actual communication, the first device may autonomously determine one or more pieces of the following information: the second subcarrier spacing, the first subcarrier spacing, the quantity M1 of symbols corresponding to the first subcarrier spacing, the quantity M2 of symbols corresponding to the second subcarrier spacing, a CP length of the symbol corresponding to the first subcarrier spacing, and a CP length of the symbol corresponding to the second subcarrier spacing. For example, parameter information is selected based on a current communication scenario. For example, in a low-speed scenario with a multipath channel and a large delay, a solution in which the quantity M1 of symbols corresponding to the first subcarrier spacing is small and the CP length is long may be used. For example, in a low-speed scenario, a solution in which the quantity M1 of symbols corresponding to the first subcarrier spacing is small may be used.

In an optional example, the first device (for example, the terminal device) may alternatively determine the parameter information based on an indication from a network side.

For example, the first device receives indication information, where the indication information indicates a first correspondence.

For example, the indication information may indicate an index (or a number or a sequence number) of the first correspondence, or may indicate one or more pieces of parameter information in the first correspondence. For example, the indication information indicates at least one of the following parameter information in the first correspondence: the first subcarrier spacing, the second subcarrier spacing, M1, M2, the cyclic prefix (CP) length of the first symbol, and the CP length of the second symbol.

The first device stores one or more tables, where the table includes a plurality of correspondences of the parameter information, and parameter information in any correspondence includes a ratio K of the first subcarrier spacing to the second subcarrier spacing, the CP length of the first symbol in the reference time unit, and the CP length of the second symbol in the reference time unit. For any correspondence, K is an integer greater than 1, and the CP length of the first symbol is greater than or equal to the CP length of the second symbol. The first device determines the first subcarrier spacing, the second subcarrier spacing, the cyclic prefix (CP) length of the first symbol, and the CP length of the second symbol, for example, the first device selects a correspondence from the table, to obtain the first subcarrier spacing, the second subcarrier spacing, the cyclic prefix (CP) length of the first symbol, and the CP length of the second symbol. A correspondence selected by the first device is referred to as a first correspondence. Selection is performed from the plurality of correspondences, so that flexibility of selection can be improved.

Optionally, the parameter information in any correspondence further includes the quantity M1 of symbols corresponding to the first subcarrier spacing in the reference time unit, and the quantity M2 of symbols corresponding to the second subcarrier spacing in the reference time unit. In an optional example, for any correspondence, the quantity M1 of symbols corresponding to the first subcarrier spacing is less than or equal to the quantity M2 of symbols corresponding to the second subcarrier spacing. Generally, one or more pieces of data correspond to one parameter signal. If a reference signal is sent by using the first subcarrier spacing, and data is sent by using the second subcarrier spacing, a quantity of symbols for sending the reference signal may be less than or equal to a quantity of symbols for sending the data. This may avoid a waste of resources. Certainly, a value relationship between M1 and M2 may not be limited.

For at least one value of K, the table may include one correspondence, or may include at least two correspondences. In this way, flexible selection can be further implemented.

At least one piece of parameter information in different correspondences is different. For example, the plurality of correspondences includes a plurality of values of K. For the first subcarrier spacing and the second subcarrier spacing (or the ratio K), a plurality of possible values are set, so that overheads of the reference signal can be flexibly adjusted.

In this application, when the correspondence between the parameter information in the table is determined in advance, the CP length of the symbol meets the following principles.

Principle 1: CP lengths of all symbols need to be the same as possible. In other words, the CP lengths of all symbols are the same, or when the CP lengths of all symbols cannot be the same, a difference between CP lengths of different symbols is as small as possible.

It may be understood that, transmitted symbols pass through a wireless multipath channel, and because of a delay characteristic of the multipath channel, continuous transmitted symbols interfere with each other after passing through the multipath channel. In this case, a CP is added to each symbol for protection. When the CP lengths of all symbols are greater than a maximum delay of the multipath channel, it can be ensured that there is no interference between symbols that are continuously transmitted. In a transmission process, the CP lengths of all symbols are the same as much as possible, to minimize interference.

Principle 2: When the second subcarrier spacing (or the first subcarrier spacing) increases proportionally, and a system bandwidth remains unchanged, the CP lengths of all symbols are still a positive integer after being correspondingly reduced proportionally.

For the principle 2, when the system bandwidth remains unchanged, a sampling rate may remain unchanged (the sampling rate for generating a symbol needs to be greater than the system bandwidth). If the second subcarrier spacing is increased to X times of the original (X is a positive integer) of the original, the duration of the symbol of the second subcarrier spacing is reduced to 1/X of the original. When the sampling rate remains unchanged, a length of the symbol of the second subcarrier spacing is reduced to 1/X of an original length. Similarly, the CP length of each symbol is reduced to 1/X of the original CP length. When the CP length of each symbol is reduced to 1/X of the original CP length and is still a positive integer, complexity of generating a discrete CP may not be affected. Compared with generating a discrete symbol by using a larger sampling rate, when an unchanged sampling rate is used, it is ensured that the CP length of each symbol is still a positive integer after being correspondingly reduced proportionally, thereby greatly reducing complexity of generating a discrete symbol.

Principle 3: For a second subcarrier spacing (or a first subcarrier spacing), when the system bandwidth is reduced proportionally, a CP length of each symbol is still a positive integer after being correspondingly reduced proportionally.

For the principle 3, when the second subcarrier spacing remains unchanged, the system bandwidth is reduced proportionally to 1/Y of the original, where Y is a positive integer. In this case, the duration of the symbol of the second subcarrier spacing remains unchanged, but a sampling rate may be reduced to 1/Y of an original sampling rate. Therefore, a length of the symbol of the second subcarrier spacing may be reduced to 1/Y of an original length. Similarly, the CP length of each symbol may be reduced to 1/Y of the original CP length. When the CP length of each symbol is reduced to 1/Y of the original CP length and is still a positive integer, complexity of generating a discrete CP may not be affected. Therefore, when a smaller sampling rate is used, it is ensured that the CP length of each symbol is still a positive integer after being correspondingly reduced proportionally. This can greatly reduce complexity of generating a discrete symbol.

For example, based on the principle 2, that the system bandwidth is 20 MHz, the second subcarrier spacing is 15 kHz, CP lengths of the $1^{st}$ symbol and the remaining symbol are respectively 160 and 144, and the symbol length is 2048 is used as an example. When the second subcarrier spacing is increased proportionally to X=8 times of the original, that is, 120 kHz, and the system bandwidth is still 20 MHz, the CP lengths of the $1^{st}$ symbol and the remaining symbol are reduced proportionally to ⅛ of the original, that is, 20 and 18 respectively, and the symbol length is reduced proportionally to 256. A proportionally reduced CP length is still a positive integer. In this way, when a subcarrier spacing is 120 kHz, the terminal device may generate a symbol whose length is 256 and CPs whose lengths are 20 and 18, and this can greatly reduce complexity of generating a symbol.

Similarly, based on the principle 3, complexity of generating a symbol may also be reduced.

It may be understood that, based on the principle 1, the principle 2, and the principle 3, in the reference time unit, for different values of K, $M_1$, and $M_2$, CP lengths that meet the foregoing principle may be designed, to reduce complexity of generating a symbol and be flexibly applied to different scenarios.

Therefore, according to the method for determining a CP length in this application, when two symbols with different subcarrier spacings are transmitted, quantities of symbols with two different subcarrier spacings may be flexibly configured, to adapt to different scenarios (for example, a high-speed scenario), reduce multipath channel interference between symbols, and reduce complexity of generating a symbol.

The following describes a plurality of examples.

Example 1: A first CP length or a second CP length is a CP length of each symbol, and the first CP length is the same as the second CP length. In other words, a CP length of the $1^{st}$ symbol is the same as the CP length of the remaining symbol, and a CP length of the symbol corresponding to the first subcarrier spacing is also the same as a CP length of the symbol corresponding to the second subcarrier spacing. In this manner, a CP length of a reference signal symbol can be the same as a CP length of a data symbol, and inter-symbol interference can be avoided.

Example 2: A first CP length is a CP length of the $1^{st}$ symbol, a second CP length is a CP length of the remaining symbol, and the first CP length is different from the second CP length. In the following example, the CP length of the $1^{st}$ symbol is greater than the CP length of the remaining symbol. The first device sends the reference signal on the $1^{st}$ symbol, and sends the data on the remaining symbol. Alternatively, the first device sends the reference signal on the $1^{st}$ symbol, sends the data on some symbols of the remaining symbols, and sends reference signals on some symbols of the remaining symbols. Therefore, it can be ensured to some extent that the CP length of the reference signal is greater than or equal to the CP length of the data symbol. Therefore, inter-symbol interference can be avoided to some extent.

Example 3: A first CP length is a CP length of the symbol corresponding to the first subcarrier spacing, a second CP length is a CP length of the symbol corresponding to the second subcarrier spacing, and the first CP length is different from the second CP length. In the following example, the CP length of the symbol corresponding to the first subcarrier spacing is greater than the CP length of the symbol corresponding to the second subcarrier spacing. Generally, estimation performance of performing channel estimation by using a reference signal is a main factor that affects demodulation performance. Therefore, compared with sending data, interference of the reference signals needs to be reduced. If the first subcarrier spacing is used to send the reference signal (and may further send the data), and the second subcarrier spacing is used to send the data, a CP length of a reference signal symbol is greater than or equal to a CP length of a data symbol, so that interference to the reference signal can be reduced as much as possible while inter-symbol interference is avoided.

It may be understood that the table described above includes a plurality of correspondences of parameter information, and one correspondence may be understood as a row in the table (for example, Table 1, Table 2, or Table 3) described below.

In addition, it may be understood that M1 and $M_1$ have the same meaning, and M2 and $M_2$ have the same meaning.

Example 1: The first CP length is the same as the second CP length. In this case, the first CP length or the second CP length is a CP length of each symbol. In this case, optionally, one CP length may be omitted when the correspondence is stored.

In a reference time unit where duration corresponding to the second subcarrier spacing $\Delta f_2$ is $T_{unit,ref}$, a relationship among the ratio K of the first subcarrier spacing to the second subcarrier spacing, the quantity M1 of symbols corresponding to the first subcarrier spacing, the quantity M2 of symbols corresponding to the second subcarrier spacing, the first CP length, and the second CP length may be shown in the following tables.

Table 1: Duration of the reference time unit is $$T_{unit,ref} = \frac{7.5}{\Delta f_2} \cdot \tau$$

and the length of the symbol corresponding to the second subcarrier spacing is $N_2=2048 \cdot \rho$. Values of the second subcarrier spacing are all or some of 3.75 kHz, 7.5 kHz, 15 kHz, 30 kHz, 60 kHz, 120 kHz, and 240 kHz.

TABLE 1

| K | $M_1$ | $M_2$ | First CP length ($N_{CP, L}$) | Second CP length ($N_{CP, S}$) |
|---|---|---|---|---|
| 2 | 2τ | 6τ | 128ρ | 128ρ |
| 2 | 3τ | 5τ | 256ρ | 256ρ |
| 2 | 4τ | 4τ | 384ρ | 384ρ |
| 4 | 2τ | 6τ | 256ρ | 256ρ |
| 4 | 5τ | 5τ | 256ρ | 256ρ |
| 8 | 2τ | 6τ | 320ρ | 320ρ |
| 8 | 3τ | 6τ | 256ρ | 256ρ |
| 8 | 6τ | 6τ | 128ρ | 128ρ |

Table 2: Duration of the reference time unit is $$T_{unit,ref} = \frac{8.75}{\Delta f_2} \cdot \tau,$$

and the length of the symbol corresponding to the second subcarrier spacing is $N_2=2048 \cdot \rho$. Values of the second subcarrier spacing are all or some of 4.3725 kHz, 8.75 kHz, 17.5 kHz, 35 kHz, 70 kHz, 140 kHz, and 280 kHz.

TABLE 2

| K | $M_1$ | $M_2$ | First CP length ($N_{CP, L}$) | Second CP length ($N_{CP, S}$) |
|---|---|---|---|---|
| 2 | 1τ | 7τ | 320ρ | 320ρ |
| 2 | 2τ | 6τ | 448ρ | 448ρ |
| 2 | 5τ | 5τ | 256ρ | 256ρ |
| 4 | 1τ | 7τ | 384ρ | 384ρ |
| 4 | 2τ | 6τ | 576ρ | 576ρ |
| 8 | 1τ | 7τ | 416ρ | 416ρ |
| 8 | 5τ | 7τ | 192ρ | 192ρ |

In a possible implementation, τ=1, and ρ=1. A representation form of Table 1 is Table 1-1.

Table 1-1: Duration $T_{unit,ref}$ of the reference time unit is $7.5/\Delta f_2 \cdot 1$ s, and the length of the symbol corresponding to the second subcarrier spacing is $N_2=2048$. Values of the second subcarrier spacing may be 15 kHz, 30 kHz, 60 kHz, 120 kHz, 240 kHz, or the like.

TABLE 1-1

| K | $M_1$ | $M_2$ | First CP length ($N_{CP, L}$) | Second CP length ($N_{CP, S}$) |
|---|---|---|---|---|
| 2 | 2 | 6 | 128 | 128 |
| 2 | 3 | 5 | 256 | 256 |
| 2 | 4 | 4 | 384 | 384 |
| 4 | 2 | 6 | 256 | 256 |
| 4 | 5 | 5 | 256 | 256 |
| 8 | 2 | 6 | 320 | 320 |
| 8 | 3 | 6 | 256 | 256 |
| 8 | 6 | 6 | 128 | 128 |

When the terminal device generates the symbol and the CP of the second subcarrier spacing, a condition needs to be met: A sampling rate $f_2$ for generating the symbol of the second subcarrier spacing is greater than the system bandwidth used by the terminal device. For example, the length of the symbol corresponding to the second subcarrier spacing $\Delta f_2$ in Table 1 is $N_2=2048 \cdot \rho$. Therefore, the sampling rate of the symbol of the first subcarrier spacing and the sampling rate of the symbol of the second subcarrier spacing may be $f_2=2048 \cdot \rho \cdot \Delta f_2$, or the sampling rate may be $2048 \cdot \rho \cdot \Delta f_2$ multiplied by a positive integer greater than 1 (for example, C1). It may be understood that when the sampling rate is $2048 \cdot \rho \cdot \Delta f_2$ multiplied by the positive integer greater than 1 (for example, C1), the first CP length and the second CP length in Table 1 are correspondingly multiplied by the positive integer greater than 1 (for example, C1).

When the sampling rate $f_2$ in Table 1 is greater than the system bandwidth, the symbol and the CP of the second subcarrier spacing may be generated by using the length $N_2$ of the symbol of the second subcarrier spacing in Table 1, the first CP length, and the second CP length. In addition, if the sampling rate $f_2$ is reduced proportionally, and the value of the sampling rate is still greater than the system bandwidth, $N_2$, the first CP length and the second CP length may also be reduced proportionally. Therefore, smaller $N_2$, smaller values of the first CP length and the second CP length may be used to generate the symbol and the CP of the second subcarrier spacing, and this greatly reduces complexity of generating a symbol. Therefore, the first CP length and the second CP length need to be still positive integers after being reduced proportionally, to support a low-complexity generation manner.

The following uses Table 1-1 as an example to describe how the first CP length and the second CP length designed in this application meet a requirement for low-complexity implementation.

Table 1-1 is used as an example. Assuming that the second subcarrier spacing is 15 kHz, the duration of the reference time unit is 0.5 ms, and a sampling frequency of the second subcarrier spacing is $f_2 = \Delta f_2 \cdot N_2 = 30.72$ MHz. Therefore, it may be learned that $0.5 \cdot 10^{-3} \cdot (30.72 \cdot 10^6) = 15360$ discrete data may be obtained when sampling is performed at an interval $T_2$ for all time domain data in the reference time unit 0.5 ms.

For example, in Table 1-1, a value of K is 2, a value of M1 is 2, and a value of M2 is 6. A total length of a symbol with two first subcarrier spacings and a symbol with six second subcarrier spacings is 2·1024+6·2048=14336. In this way, the total length of CPs of all symbols is 15360−14336=1024, and a CP length of each symbol may be 1024/8=128. In this way, the principle 1 is met, and CP lengths of all symbols are the same.

For the principle 2, when the system bandwidth is 20 MHz, and the second subcarrier spacing is 15 kHz, a sampling frequency of the terminal device needs to be greater than the system bandwidth. In this way, the terminal device may generate a symbol by using a symbol length $N_2=2048$ (a corresponding $f_2$ is 30.72 MHz and is greater than the system bandwidth). When the system bandwidth is 20 MHz and the second subcarrier spacing is increased to 60 kHz, the terminal device may also generate a symbol and a CP by using configurations: $N_2=2048$ (a corresponding $f_2$ is 122.88 MHz and is greater than the system bandwidth), the first CP length is 128, and the second CP length is 128. However, in this way, the complexity of generating a symbol is high. In this way, the terminal device may reduce $N_2$, the first CP length, and the second CP length to ¼ of the original proportionally, that is, $N_2=512$ (a corresponding $f_2$ is 30.72 MHz and is greater than the system bandwidth), the first CP length is 32, and the second CP length is 32. In this way, the complexity of generating a symbol can be greatly reduced. In addition, the first CP length and the second CP length are still positive integers after being reduced proportionally, which does not affect CP generation. Therefore, the principle 2 is met.

For the principle 3, when the system bandwidth is reduced from 20 MHz to 5 MHz, the second subcarrier spacing is 15 kHz. In this case, the terminal device may still generate a symbol by using a symbol length $N_2=2048$ (a corresponding $f_2$ is 30.72 MHz and is greater than the system bandwidth). However, complexity is also high. In this way, the terminal device may reduce $N_2$, the first CP length, and the second CP length to ¼ of the original proportionally, that is, $N_2=512$ (a corresponding $f_2$ is 7.68 MHz and is greater than the system bandwidth), the first CP length is 32, and the second CP length is 32. In this way, the complexity of generating a symbol can be greatly reduced. In addition, the first CP length and the second CP length are still positive integers after being reduced proportionally, which does not affect CP generation. Therefore, the principle 3 is met.

In a possible implementation, $\tau=2$, and $\rho=1$. A representation form of Table 1 is Table 1-2.

Table 1-2: Duration $T_{unit,ref}$ of the reference time unit is $7.5/\Delta f_2 \cdot 2$ s, the length of the symbol corresponding to the second subcarrier spacing is $N_2=2048$, and duration of the symbol corresponding to the second subcarrier spacing is $N_2 T_2$, where $T_2=1/f_2$, and $f_2=4 N_2$. Values of the second subcarrier spacing may be 15 kHz, 30 kHz, 60 kHz, 120 kHz, 240 kHz, or the like.

TABLE 1-2

| K | $M_1$ | $M_2$ | First CP length ($N_{CP, L}$) | Second CP length ($N_{CP, S}$) |
|---|---|---|---|---|
| 2 | 4 | 12 | 128 | 128 |
| 2 | 6 | 10 | 256 | 256 |
| 2 | 8 | 8 | 384 | 384 |
| 4 | 4 | 12 | 256 | 256 |
| 4 | 10 | 10 | 256 | 256 |
| 8 | 4 | 12 | 320 | 320 |
| 8 | 6 | 12 | 256 | 256 |
| 8 | 12 | 12 | 128 | 128 |

In a possible implementation, $\tau=1$, and $\rho=2$. A representation form of Table 1 is Table 1-3.

Table 1-3: Duration $T_{unit,ref}$ of the reference time unit is $7.5/\Delta f_2$ s, and the length of the symbol corresponding to the second subcarrier spacing is $N_2=4096$. Values of the second subcarrier spacing may be 15 kHz, 30 kHz, 60 kHz, 120 kHz, 240 kHz, or the like.

TABLE 1-3

| K | $M_1$ | $M_2$ | First CP length ($N_{CP, L}$) | Second CP length ($N_{CP, S}$) |
|---|---|---|---|---|
| 2 | 2 | 6 | 256 | 256 |
| 2 | 3 | 5 | 512 | 512 |
| 2 | 4 | 4 | 768 | 768 |
| 4 | 2 | 6 | 512 | 512 |
| 4 | 5 | 5 | 512 | 512 |
| 8 | 2 | 6 | 640 | 640 |
| 8 | 3 | 6 | 512 | 512 |
| 8 | 6 | 6 | 256 | 256 |

In a possible implementation, $\tau=1$, and $\rho=0.5$. A representation form of Table 1 is Table 1-4. The length of the symbol corresponding to the second subcarrier spacing is $N_2=1024$. Values of the second subcarrier spacing may be 15 kHz, 30 kHz, 60 kHz, 120 kHz, 240 kHz, or the like.

TABLE 1-4

| K | $M_1$ | $M_2$ | First CP length ($N_{CP, L}$) | Second CP length ($N_{CP, S}$) |
|---|---|---|---|---|
| 2 | 2 | 6 | 64 | 64 |
| 2 | 3 | 5 | 128 | 128 |
| 2 | 4 | 4 | 192 | 192 |
| 4 | 2 | 6 | 128 | 128 |
| 4 | 5 | 5 | 128 | 128 |
| 8 | 2 | 6 | 160 | 160 |
| 8 | 3 | 6 | 128 | 128 |
| 8 | 6 | 6 | 64 | 64 |

In a possible implementation, $\tau=1$, and $\rho=1$. A representation form of Table 2 is Table 2-1.

Table 2-1: Duration $T_{unit,ref}$ of the reference time unit is $8.75/\Delta f_2$ s, and the length of the symbol corresponding to the second subcarrier spacing is $N_2=2048$. Values of the second subcarrier spacing may be 17.5 kHz, 35 kHz, 70 kHz, 140 kHz, 280 kHz, or the like.

TABLE 2-1

| K | $M_1$ | $M_2$ | First CP length ($N_{CP, L}$) | Second CP length ($N_{CP, S}$) |
|---|---|---|---|---|
| 2 | 1 | 7 | 320 | 320 |
| 2 | 2 | 6 | 448 | 448 |
| 2 | 5 | 5 | 256 | 256 |
| 4 | 1 | 7 | 384 | 384 |
| 4 | 2 | 6 | 576 | 576 |
| 8 | 1 | 7 | 416 | 416 |
| 8 | 5 | 7 | 192 | 192 |

Example 2: The first CP length is different from the second CP length, the first CP length is a CP length of the $1^{st}$ symbol, and the second CP length is the CP length of the remaining symbol. In the following example, the first CP length is greater than the second CP length.

In a reference time unit where duration corresponding to the second subcarrier spacing $\Delta f_2$ is $T_{unit,ref}$, a relationship among the ratio K of the first subcarrier spacing to the second subcarrier spacing, the quantity M1 of symbols corresponding to the first subcarrier spacing, the quantity M2 of symbols corresponding to the second subcarrier spacing, the first CP length, and the second CP length may be shown in the following table.

Table 3: Duration of the reference time unit is $$T_{unit,ref} = \frac{7.5}{\Delta f_2} \cdot \tau,$$

and the length of the symbol corresponding to the second subcarrier spacing is $N_2=2048 \cdot \rho$. Values of the second subcarrier spacing are all or some of 15 kHz, 30 kHz, 60 kHz, 120 kHz, and 240 kHz.

TABLE 3

| K | $M_1$ | $M_2$ | CP length of a $1^{st}$ symbol ($N_{CP, L}$) | CP length of a remaining symbol ($N_{CP, S}$) |
|---|---|---|---|---|
| 2 | 4τ | 5τ | 128ρ | 112ρ |
| 4 | 3τ | 6τ | 256ρ | 160ρ |
| 4 | 3τ | 6τ | 192ρ | 168ρ |
| 4 | 4τ | 6τ | 160ρ | 96ρ |
| 4 | 4τ | 6τ | 124ρ | 100ρ |
| 8 | 4τ | 6τ | 248ρ | 200ρ |
| 8 | 4τ | 6τ | 212ρ | 204ρ |

Table 4: Duration of the reference time unit is $$T_{unit,ref} = \frac{8.75}{\Delta f_2} \cdot \tau,$$

and the length of the symbol corresponding to the second subcarrier spacing is $N_2=2048 \cdot \rho$. Values of the second subcarrier spacing are all or some of 17.5 kHz, 35 kHz, 70 kHz, 140 kHz, and 280 kHz.

TABLE 4

| K | $M_1$ | $M_2$ | CP length of a $1^{st}$ symbol ($N_{CP, L}$) | CP length of a remaining symbol ($N_{CP, S}$) |
|---|---|---|---|---|
| 2 | 3τ | 6τ | 320ρ | 280ρ |
| 4 | 2τ | 7τ | 320ρ | 280ρ |
| 4 | 3τ | 6τ | 512ρ | 448ρ |

TABLE 4-continued

| K | $M_1$ | $M_2$ | CP length of a $1^{st}$ symbol ($N_{CP, L}$) | CP length of a remaining symbol ($N_{CP, S}$) |
|---|---|---|---|---|
| 4 | 6τ | 6τ | 272ρ | 208ρ |
| 8 | 2τ | 7τ | 384ρ | 336ρ |
| 8 | 6τ | 6τ | 400ρ | 336ρ |

In a possible implementation, τ=1, and ρ=1. A representation form of Table 3 is Table 3-1.

Table 3-1: Duration $T_{unit,ref}$ of the reference time unit is 7.5/$\Delta f_2$ ins, and the length of the symbol corresponding to the second subcarrier spacing is $N_2=2048$. Values of the second subcarrier spacing may be 15 kHz, 30 kHz, 60 kHz, 120 kHz, 240 kHz, or the like.

TABLE 3-1

| K | $M_1$ | $M_2$ | CP length of a $1^{st}$ symbol ($N_{CP, L}$) | CP length of a remaining symbol ($N_{CP, S}$) |
|---|---|---|---|---|
| 2 | 4 | 5 | 128 | 112 |
| 4 | 3 | 6 | 256 | 160 |
| 4 | 3 | 6 | 192 | 168 |
| 4 | 4 | 6 | 160 | 96 |
| 4 | 4 | 6 | 124 | 100 |
| 8 | 4 | 6 | 248 | 200 |
| 8 | 4 | 6 | 212 | 204 |

The following uses Table 3-1 as an example to describe how the first CP length (the CP length of the $1^{st}$ symbol) and the second CP length (the CP length of the remaining symbol) designed in this application meet a requirement for low-complexity implementation.

Table 3-1 is used as an example. Assuming that the second subcarrier spacing is 15 kHz, the duration of the reference time unit is 0.5 ms, and $f_2$=30.72 MHz. Therefore, it may be learned that $0.5 \cdot 10^{-3} \cdot (30.72 \cdot 10^6) = 15360$ discrete data may be obtained when sampling is performed at an interval $T_2$ of for all time domain data in the reference time unit 0.5 ms.

For example, in Table 3-1, a value of K is 2, a value of M1 is 4, and a value of M2 is 5. A total length of symbols with four first subcarrier spacings and symbols with five second subcarrier spacings is $4 \cdot 1024 + 5 \cdot 2048 = 14336$. In this way, a total length of CPs of all symbols is $15360 - 14336 = 1024$. Because a total quantity of symbols is 9, and $1024/9 \approx 113.8$ is not a positive integer, CP lengths of all symbols cannot be the same. In this case, the CP length of the $1^{st}$ symbol may be slightly longer than the CP length of the remaining symbol. In addition, the principle 2 and the principle 3 need to be met, so that the CP length can be reduced proportionally. In this way, it can be learned that the three principles are met. A maximum length less than 113.8 is 112, and 112 may be used as the CP length of the remaining symbol. Correspondingly, the CP length of the $1^{st}$ symbol is $1024 - 112 \cdot 8 = 128$. In this case, a difference between the CP length of the $1^{st}$ symbol and the CP length of the remaining symbol is smallest, and the principle 1 is met.

For the principle 2, when the system bandwidth is 20 MHz and the second subcarrier spacing is 15 kHz, the terminal device may generate a symbol by using a configuration of a symbol length $N_2=2048$ (a corresponding $f_s$ is 30.72 MHz and is greater than the system bandwidth), the CP length of the $1^{st}$ symbol is 128, and the CP length of the remaining symbol is 112. When the system bandwidth is 20 MHz, and the second subcarrier spacing is increased to 120 kHz, the terminal device may also generate a symbol by using a configuration $N_2=2048$ (a corresponding $f_2$ is 245.76 MHz and is greater than the system bandwidth) in which the CP length of the $1^{st}$ symbol is 128, and the CP length of the remaining symbol is 112. However, in this way, complexity of generating a symbol is high. In this way, the terminal device may reduce $N_2$, the first CP length, and the second CP length to ⅛ of the original proportionally, that is, $N_2=256$ (a corresponding $f_2$ is 30.72 MHz and is greater than the system bandwidth), the first CP length is 16, and the second CP length is 14. In this way, complexity of generating a symbol can be greatly reduced. In addition, the first CP length and the second CP length are still positive integers after being reduced to ⅛ proportionally, which does not affect CP generation. Therefore, the principle 2 is met.

Similarly, it is easy to know that the design of Table 3-1 meets the principle 3.

In a possible implementation, $\tau=2$, and $\rho=1$. A representation form of Table 3 is Table 3-2.

Table 3-2: Duration $T_{unit,ref}$ of the reference time unit is $15/\Delta f_2$ ms, and the length of the symbol corresponding to the second subcarrier spacing is $N_2=2048$. Values of the second subcarrier spacing may be 15 kHz, 30 kHz, 60 kHz, 120 kHz, 240 kHz, or the like.

TABLE 3-2

| K | $M_1$ | $M_2$ | CP length of a $1^{st}$ symbol ($N_{CP, L}$) | CP length of a remaining symbol ($N_{CP, s}$) |
|---|---|---|---|---|
| 2 | 8 | 10 | 128 | 112 |
| 4 | 6 | 12 | 256 | 160 |
| 4 | 6 | 12 | 192 | 168 |
| 4 | 8 | 12 | 160 | 96 |
| 4 | 8 | 12 | 124 | 100 |
| 8 | 8 | 12 | 248 | 200 |
| 8 | 8 | 12 | 212 | 204 |

In a possible implementation, $\tau=1$, and $\rho=1$. A representation form of Table 4 is Table 4-1.

Table 4-1: Duration $T_{unit,ref}$ of the reference time unit is $8.75/\Delta f_2$ ms, and the length of the symbol corresponding to the second subcarrier spacing is $N_2=2048$. Values of the second subcarrier spacing may be 17.5 kHz, 35 kHz, 70 kHz, 140 kHz, 280 kHz, or the like.

TABLE 4-1

| K | $M_1$ | $M_2$ | CP length of a $1^{st}$ symbol ($N_{CP, L}$) | CP length of a remaining symbol ($N_{CP, s}$) |
|---|---|---|---|---|
| 2 | 3 | 6 | 320 | 280 |
| 4 | 2 | 7 | 320 | 280 |
| 4 | 3 | 6 | 512 | 448 |
| 4 | 6 | 6 | 272 | 208 |
| 8 | 2 | 7 | 384 | 336 |
| 8 | 6 | 6 | 400 | 336 |

Example 3: The first CP length is different from the second CP length. The first CP length is the CP length of the symbol corresponding to the first subcarrier spacing, and the second CP length is the CP length of the symbol corresponding to the second subcarrier spacing.

In a reference time unit where duration corresponding to the second subcarrier spacing $\Delta f_2$ is $T_{unit,ref}$, a relationship among the ratio K of the first subcarrier spacing to the second subcarrier spacing, the quantity M1 of symbols corresponding to the first subcarrier spacing, the quantity M2 of symbols corresponding to the second subcarrier spacing, the first CP length, and the second CP length may be shown in the following table.

Table 5: Duration of the reference time unit is $$T_{unit,ref} = \frac{7.5}{\Delta f_2} \cdot \tau,$$

and the length of the symbol corresponding to the second subcarrier spacing is $N_2=2048\cdot\rho$. Values of the second subcarrier spacing are all or some of 15 kHz, 30 kHz, 60 kHz, 120 kHz, and 240 kHz.

TABLE 5

| K | $M_1$ | $M_2$ | CP length of a symbol of the first subcarrier spacing ($N_{CP, L}$) | CP length of a symbol of the second subcarrier spacing ($N_{CP, s}$) |
|---|---|---|---|---|
| 2 | 2τ | 6τ | 176ρ | 112ρ |
| 2 | 2τ | 6τ | 152ρ | 120ρ |
| 2 | 4τ | 5τ | 136ρ | 96ρ |
| 2 | 4τ | 5τ | 116ρ | 112ρ |
| 4 | 3τ | 6τ | 192ρ | 160ρ |
| 4 | 4τ | 6τ | 112ρ | 96ρ |
| 8 | 4τ | 6τ | 224ρ | 192ρ |
| 8 | 6τ | 6τ | 144ρ | 112ρ |

In a possible implementation, $\tau=1$, and $\rho=1$. A representation form of Table 5 is Table 5-1.

Table 5-1: Duration $T_{unit,ref}$ of the reference time unit is $7.5/\Delta f_2$ ins, and the length of the symbol corresponding to the second subcarrier spacing is $N_2=2048$. Values of the second subcarrier spacing may be 15 kHz, 30 kHz, 60 kHz, 120 kHz, 240 kHz, or the like.

TABLE 5-1

| K | $M_1$ | $M_2$ | CP length of a symbol of the first subcarrier spacing ($N_{CP, L}$) | CP length of a symbol of the second subcarrier spacing ($N_{CP, s}$) |
|---|---|---|---|---|
| 2 | 2 | 6 | 176 | 112 |
| 2 | 2 | 6 | 152 | 120 |
| 2 | 4 | 5 | 136 | 96 |
| 2 | 4 | 5 | 116 | 112 |
| 4 | 3 | 6 | 192 | 160 |
| 4 | 4 | 6 | 112 | 96 |
| 8 | 4 | 6 | 224 | 192 |
| 8 | 6 | 6 | 144 | 112 |

In an optional example, in this application, a time particle $T_b$ may be predefined, where $$T_b = \frac{1}{N_b \cdot \Delta f_b}, N_b,$$

and $\Delta f_b$ may be predefined. For example, $N_b$ is predefined as 4096, and $\Delta f_b$ is predefined as 480 kHz. $N_b$ may be a positive integer power of 2, and a value of $N_b$ is greater than a quantity of subcarriers corresponding to a maximum bandwidth for sending data by the terminal device, and $\Delta f_b$ may be greater than a maximum subcarrier spacing supported by a system. For example, $\Delta f_b$ may be predefined as the maximum subcarrier spacing supported by the system, or may be predefined as two times the maximum subcarrier spacing supported by the system, or may be predefined as four times the maximum subcarrier spacing supported by the system.

It may be understood that $T_b$ is less than $T_2$, and $T_2$ is v times of $T_b$, and then $$v = \frac{N_b \cdot \Delta f_b}{\Delta f_2 \cdot N_2}.$$

It may be understood that when sampling is performed at the time interval $T_b$, a length of the symbol corresponding to the second subcarrier spacing is $vN_2$, the first CP length changes to $vN_{CP,L}$, and the second CP length changes to $vN_{CP,S}$. When sampling is performed at a time interval $T_b$, because a length of a symbol, the first CP length, and the second CP length are multiplied by v times an original value, complexity of generating a symbol becomes higher.

By defining the time particle $T_b$, a maximum sampling rate $1/T_b$ of the system may be defined. That is, for all possible system bandwidth values, the maximum sampling rate is less than $1/T_b$. For the system bandwidth selected by the terminal device, the maximum sampling rate of the system may be divided by a positive integer W to obtain a value $1/(W \cdot T_b)$, which meets that $1/(W \cdot T_b)$ is greater than the selected system bandwidth and $1/((W+1) \cdot T_b)$ is less than the selected system bandwidth. Therefore, an orthogonal frequency division multiplexing OFDM symbol and a CP may be generated by using a length of a symbol corresponding to the sampling rate $1/(W \cdot T_b)$, the first CP length, and the second CP length, to reduce complexity of generating a symbol.

Optionally, first duration may be predefined, and is represented as $T_{sf}$.

For example, $T_{sf}$ may be 0.5 ms or 1 ms. For example, the first duration $$T_{sf} = \left(N_b \cdot \frac{\Delta f_b}{1000}\right) \cdot T_b$$

may be defined. When $N_b$ is predefined as 4096 and $\Delta f_b$ is predefined as 480 kHz, $T_{sf}=0.5$ ms. An LTE system is used as an example. Duration of a slot (slot) in the LTE system is 0.5 ms, and seven OFDM symbols with a subcarrier spacing of 15 kHz are included.

For example, the first duration $$T_{sf} = \left(N_b \cdot \frac{\Delta f_b}{2000}\right) \cdot T_b$$

may be defined. When $N_b$ is predefined as 4096 and $\Delta f_b$ is predefined as 480 kHz, $T_{sf}=1$ ms.

The first duration is greater than the reference time unit. Specifically, the first duration is $\gamma$ times the reference time unit, and $\gamma$ is a positive integer. That is, $$\gamma = \frac{T_{sf}}{T_{unit,ref}}$$

It may be understood that $\gamma$ corresponds to a value of the second subcarrier spacing. The first duration includes $\gamma$ reference time units.

For example:

$$T_{unit,ref} = \frac{7.5}{\Delta f_2} \cdot \tau$$

$$\gamma = \frac{T_{sf} \cdot \Delta f_2}{7.5 \cdot \tau}$$

It may be understood that the first duration is irrelevant to the second subcarrier spacing. In Example 2, when the first CP length is different from the second CP length, the first CP length is the CP length of the $1^{st}$ symbol, and the second CP length is the CP length of the remaining symbol, a CP length of a $1^{st}$ symbol in the first duration may be different from the CP length of the remaining symbol. When $\gamma$ is greater than 1, the CP length of the $1^{st}$ symbol in the first duration may be greater than the CP length of the remaining symbol. When the 1st symbol is used to send the reference signal, interference to the reference signal may be greatly reduced.

For the first subcarrier spacing and the second subcarrier spacing (or the ratio K), a plurality of possible values are set, so that overheads of the reference signal can be flexibly adjusted.

For the quantity M1 of symbols corresponding to the first subcarrier spacing and the quantity M2 corresponding to the second subcarrier spacing, a plurality of possible values are set, so that requirements in different scenarios can be more flexibly adapted. For example, in a high-speed scenario, the quantity M1 corresponding to the first subcarrier spacing may be increased to meet a requirement for fast channel tracking. In a low-speed scenario and a scenario in which a delay of a multipath channel is large, the quantity M1 corresponding to the first subcarrier spacing may be reduced and a CP length that is large enough may be selected.

The CP length (duration) can be set to a plurality of possible values to flexibly select the CP length, reduce inter-symbol interference, improve spectral efficiency, and improve demodulation performance and spectral efficiency. Optionally, the CP length may be increased proportionally or reduced proportionally in different subcarrier spacings of a reference signal symbol and/or subcarrier spacings of a data symbol.

The foregoing example describes a plurality of solutions (one solution may be understood as a correspondence in the table), and the plurality of solutions may be applicable to a plurality of scenarios. For example, in a low-speed scenario, a solution in which the quantity M1 of symbols corresponding to the first carrier spacing is small may be used. For example, a solution in Table 1-1 in which K=2, $M_1$=2, $M_2$=6, and a CP length of each symbol is 128 may be used. For example, in a high-speed scenario, a solution in which the quantity M1 of symbols corresponding to the first carrier spacing is large may be used. For example, a solution in Table 1-1 in which K=8, $M_1$=6, $M_2$=6, and a CP length of each symbol is 128 may be used. In a low-speed scenario in which a delay of a multipath channel is large, a solution in which the quantity M1 of symbols corresponding to the first carrier spacing is small and the CP length is long may be used. For example, a solution in Table 1-1 in which K=8, $M_1$=2, $M_2$=6, and a CP length of each symbol is 320 is used.

The CP length may also be related to a modulation scheme. In actual communication, the terminal device may select a solution of an appropriate CP length based on the modulation scheme. Optionally, a correspondence among the first subcarrier spacing, the second subcarrier spacing, the cyclic prefix (CP) length of the first symbol, and the CP length of the second symbol may be related to the modulation scheme. For example, a first row in Table 1-1 may be applied to QPSK modulation or 16QAM modulation. An eighth row in Table 1-1 may be used for 64QAM modulation. Modulation data obtained in different modulation schemes has different tolerance capabilities for inter-symbol interference and channel estimation errors. Therefore, for different modulation schemes, an appropriate CP length, the quantity M1 of symbols corresponding to the first subcarrier spacing, and the quantity M2 of symbols corresponding to the second subcarrier spacing may be used, to obtain better performance.

In actual communication, the network device may send a first indication to the terminal device, to indicate a solution (a correspondence) used to indicate some or all values in the foregoing table.

For example, the first indication is used to indicate a row number (which may also be referred to as an index, a number, or a sequence number). Any table is used as an example. There are eight rows of values in the table, and each row has a corresponding number, which is 0 to 7 separately. The network device may use 3 bits to indicate a row number. For example, 000 represents a row whose number is 0, and 111 represents a row whose number is 7.

For example, the first indication is used to indicate one or more pieces of the following information:
the second subcarrier spacing, the ratio K of the first subcarrier spacing to the second subcarrier spacing, the quantity M1 of symbols corresponding to the first subcarrier spacing, the quantity M2 of symbols corresponding to the second subcarrier spacing, the CP length of the symbol corresponding to the first subcarrier spacing, and the CP length of the symbol corresponding to the second subcarrier spacing.

In this way, the terminal device may select a corresponding solution based on an indication of the network device, to send the reference signal and the data.

The network device and the terminal device may store a table in the plurality of tables, or may store the plurality of tables. Optionally, the network device may further send a second indication to the terminal device, where the second indication is used to indicate a table in the foregoing table to be used.

The network device may send the first indication and/or the second indication by using higher layer signaling (for example, radio resource control (RRC) signaling).

In a manner of indication by using higher layer signaling, a solution may be flexibly configured based on different scenario requirements.

The terminal device sends the reference signal and the data by using a first time unit. The first time unit may include P reference time units. In other words, duration $T_{unit}$ of the first time unit is P times duration $T_{unit,ref}$ of the reference time unit, and P is a positive integer, for example, 1, 2, or 3. The terminal device determines a CP length of each symbol in the first time unit based on the first CP length and the second CP length. The duration of the first time unit may be less than, equal to, or greater than the first duration. Because the first duration includes γ reference time units, it may be understood that when the duration of the first time unit is less than the first duration, the P reference time units of the first time unit are a part of γ reference time units, for example, may be start P reference time units of γ reference time units. When the duration of the first time unit is greater than or equal to the first duration, the Preference time units of the first time unit are repetitions of γ reference time units of the first duration.

When the first CP length is the same as the second CP length, it is easy to understand that CP lengths of all symbols in the first time unit are the same.

When the first CP length is different from the second CP length, that the first CP length in Example 2 is the CP length of the $1^{st}$ symbol, and the second CP length is the CP length of the remaining symbol is used as an example.

In a possible implementation, for any reference time unit in the first time unit, the CP length of the $1^{st}$ symbol in the reference time unit is the first CP length, and the CP length of the remaining symbol is the second CP length.

For example, a CP length of an $h^{th}$ symbol generated by the terminal device may be represented as:

$$N_{CP,h} = \begin{cases} N_{CP,L}, & h \bmod (M_1 + M_2) = 0 \\ N_{CP,S}, & h \bmod (M_1 + M_2) \neq 0 \end{cases}$$

The first time unit may include Preference time units. Therefore, it may be learned that the first time unit includes $P(M_1+M_2)$ symbols, and a value range of h may be an integer from 0 to $P(M_1+M_2)-1$.

In still another possible implementation, the P reference time units in the first time unit are some or repeated γ reference time units in the first duration. The CP length of the $1^{st}$ symbol in the first duration may be different from the CP length of the remaining symbol. The CP length of the $1^{st}$ symbol in the first duration may be determined based on the first CP length and the second CP length, and the CP length of the remaining symbols is the second CP length.

Therefore, for example, the CP length of the $h^{th}$ symbol generated by the terminal device may also be represented as:

$$N_{CP,h} = \begin{cases} N_{CP,S} + (N_{CP,L} - N_{CP,S}) \cdot \gamma, & h = 0 \text{ or } h = (M_1 + M_2) \cdot \gamma \\ N_{CP,S}, & h \neq 0 \text{ or } h \neq (M_1 + M_2) \cdot \gamma \end{cases}$$

It may be understood that when γ is greater than 1, when the Preference time units in the first time unit are a part or repetition of γ reference time units in the first duration, the CP length of the $1^{st}$ symbol in the first time unit (also the CP length of the $1^{st}$ symbol in the first duration) greatly exceeds the CP length of the remaining symbol. The $1^{st}$ symbol may be used to send the reference signal, and this greatly reduces interference to the reference signal.

Optionally, the duration of the first time unit may alternatively be less than that of the reference time unit, that is, the terminal device performs transmission by using some symbols in $M_1+M_2$ symbols in the reference time unit.

When the first CP length is different from the second CP length, an example in which the first CP length is the CP length of the symbol of the first subcarrier spacing and the second CP length is the CP length of the symbol of the second subcarrier spacing in Example 3.

The CP length of the $h^{th}$ symbol generated by the terminal device may be:

$$N_{CP,h} = \begin{cases} N_{CP,L} & h \in I_{unit,1} \\ N_{CP,S}, & h \in I_{unit,2} \end{cases}$$

A symbol location of the first subcarrier spacing in the first time unit is represented by $I_{unit,1}$, and a symbol location of the second subcarrier spacing in the first time unit is represented by $I_{unit,2}$.

For example, in the third row in Table 1-1, $N_2$=2048, K=2, M1=4, $M_2$=4, $N_{CP,S}$=384, $N_{CP,L}$=384, and the system bandwidth is 20 MHz.

Figure 3A:
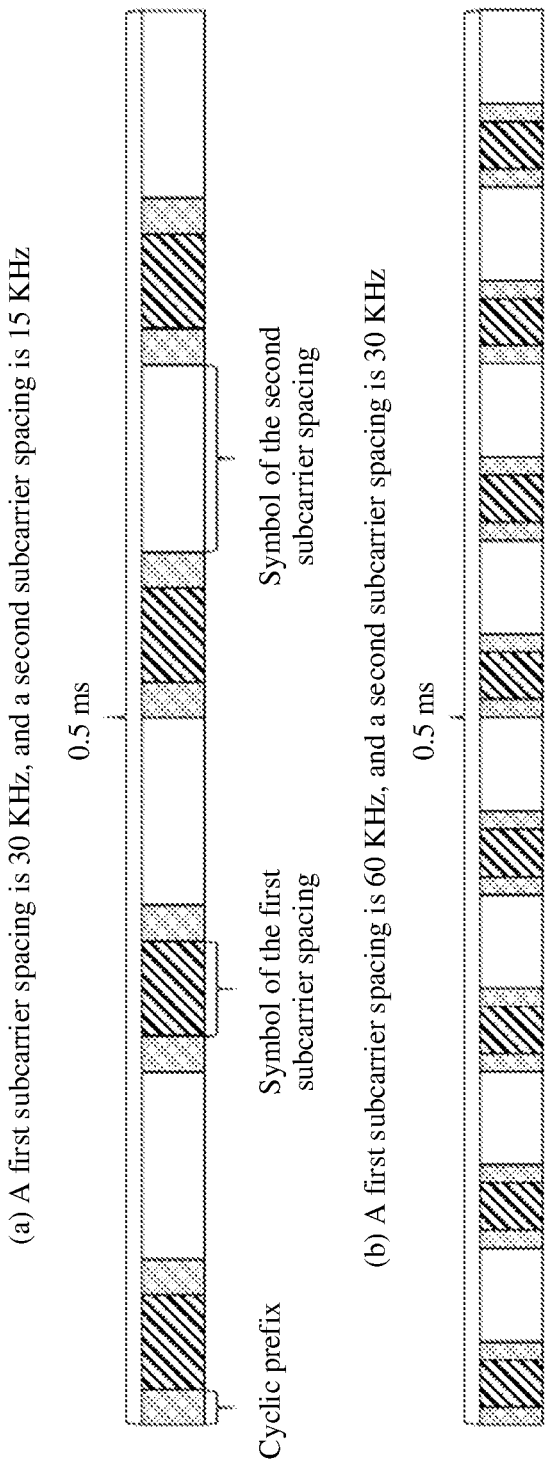
FIG. 3a is a schematic diagram of locations of an example reference signal and data according to an embodiment of this application.

For example, as shown in (a) in FIG. 3a, the first subcarrier spacing used by the terminal device is $\Delta f_1$=30 KHz, the second subcarrier spacing is $\Delta f_2$=15 KHz, and the first time unit is 0.5 ms. In this case, P=1, that is, the first time unit includes one reference time unit, (a) in FIG. 3a includes eight symbols, and a CP length of each symbol in (a) in FIG. 3a is 384, that is, CP duration of each symbol is 384/$f_2$, where $f_2$=$\Delta f_2 \cdot N_2$=30.72 MHz.

For example, as shown in (b) in FIG. 3a, the first subcarrier spacing used by the terminal device is $\Delta f_1$=60 KHz, the second subcarrier spacing is $\Delta f_2$=30 KHz, and the first time unit is 0.5 ms. In this case, P=2, that is, the first time unit includes two reference time units, (b) in FIG. 3a includes 16 symbols, and a CP length of each symbol in (b) in FIG. 3a is $N_{CP,S}$=384, that is, CP duration of each symbol is 384/$f_2$, where $f_2$=$\Delta f_2 \cdot N_2$=61.44 MHz. In this case, the sampling rate $f_2$ may be reduced to $$f'_2 = \frac{f_2}{4} = 30.72 \text{ MHz},$$

that is ½ of the original sampling rate, and $f'_2$ is still greater than the system bandwidth 20 MHz. Therefore, correspondingly, a symbol length corresponding to the second subcarrier spacing is reduced to 1024, a symbol CP length of each symbol is reduced to 192, and CP duration of each symbol remains 192/$f'_2$ unchanged, and this reduces complexity of generating a symbol.

For another example, when the first subcarrier spacing is $\Delta f_1$=120 KHz, the second subcarrier spacing is $\Delta f_2$=60 KHz, and the first time unit is 0.5 ms. In this case, P=4, the first time unit includes 32 symbols, and the sampling rate $f_2$ may be reduced to $$f'_2 = \frac{f_2}{2} = 30.72 \text{ MHz},$$

that is ¼ of the original sampling rate. Correspondingly, the length of the symbol corresponding to the second subcarrier spacing is reduced to 512, a symbol CP length of each symbol is reduced to 96, and CP duration of each symbol remains 96/$f'_2$ unchanged, and this reduces complexity of generating a symbol.

The foregoing describes only a quantity of symbols $M_1+M_2$. A protocol may specify locations corresponding to $M_1+M_2$ symbols in each solution (each row in the table). The reference time unit includes $M_1+M_2$ symbols in total, and location indexes of the $M_1+M_2$ symbols in the reference time unit may be represented as 0 to $M_1+M_2-1$.

Take K=2, $M_1$=2, and $M_2$=6 as an example. There are eight symbols in the reference time unit. The protocol may specify that location indexes of the two symbols corresponding to the first subcarrier spacing may be 0 and 4, and location indexes of six symbols corresponding to the second subcarrier spacing may be 1, 2, 3, 5, 6, and 7. Alternatively, the protocol specifies that location indexes of two symbols corresponding to the first subcarrier spacing are 2 and 6, and location indexes of six symbols corresponding to the second subcarrier spacing may be 0, 1, 3, 4, 5, and 7.

In an actual communication process, if $M_1+M_2$ symbols in a solution (each row in the table) correspond to one location combination, the location combination may be used. If $M_1+M_2$ symbols in a solution (each row in the table) correspond to a plurality of location combinations, the terminal device may select a location combination from the plurality of location combinations specified in the protocol for use. For example, the location indexes of two symbols corresponding to the first subcarrier spacing selected by the terminal device may be 0 and 4, and the location indexes of six symbols corresponding to the second subcarrier spacing may be 1, 2, 3, 5, 6, and 7. Such a location combination is used. In an actual communication process, the network device may alternatively send indication information to the terminal device, where the indication information indicates a location combination that the network device recommends to the terminal device. For example, 1-bit RRC signaling may be used to indicate the two possible location combinations. The indication may be sent by using RRC signaling.

In addition, a location index of the symbol corresponding to the first subcarrier spacing in the reference time unit may be located in a set, and a location index of the symbol corresponding to the second subcarrier spacing may be located in another set. For example, the location indexes of two symbols corresponding to the first subcarrier spacing may be a set {0, 4}, and the location indexes of six symbols corresponding to the second subcarrier spacing may be a set {1, 2, 3, 5, 6, 7}. Alternatively, the location indexes of two symbols corresponding to the first subcarrier spacing may be a set {2, 6}, and the location indexes of six symbols corresponding to the second subcarrier spacing may be a set {0, 1, 3, 4, 5, 7}.

For example, the location index of the symbol corresponding to the first subcarrier spacing is included in a location set $I_1$, and the location index of the symbol corresponding to the second subcarrier spacing is included in a location set $I_2$. The location set $I_1$ may be indicated by using RRC signaling, and the location set $I_2$ may be indicated by using RRC signaling.

In an actual communication process, alternatively, the terminal device may automatically determine a location index combination of a symbol, and notify the network device of the combination.

When the symbol in the first time unit is a repetition of the symbol in the reference time unit, the symbol location in the first time unit may be determined based on the symbol location in the reference time unit.

In a possible implementation, the symbol location of the first subcarrier spacing in the first time unit is represented as $I_{unit,1}$, and the symbol location of the second subcarrier spacing is represented as $I_{unit,2}$. Because the first time unit includes P reference time units, a quantity of symbols included in the first time unit is $(M_1+M_2) \cdot P$. A relationship between $I_{unit,1}$ and $I_{unit,2}$ and the symbol location sets $I_1$ corresponding to the $M_1$ first subcarrier spacings included in the reference time unit and the symbol location sets $I_2$ corresponding to the $M_2$ second subcarrier spacings included may be represented as follows:

$$I_{unit,1}(n) = I_1(n \bmod M_1) + \left\lfloor \frac{n}{M_1} \right\rfloor \times (M_1 + M_2)$$

-continued $$I_{unit,2}(m) = I_2(m \bmod M_2) + \left\lfloor \frac{m}{M_2} \right\rfloor \times (M_1 + M_2)$$

mod is a modulo operation, a value of n is 0 to $M_1 \cdot P-1$, and a value of m is 0 to $M_2 \cdot P-1$. $I_{unit,1}(n)$ is an $n^{th}$ element in the set $I_{unit,1}$, $I_1(n \bmod M1)$ is an n mod $M_1^{th}$ element in the set $I_1$, $I_{unit,2}(m)$ is an $m^{th}$ element in the set $I_{unit,2}$, and $I_2(m \bmod M_2)$ is an m mod $M_2$th element in the set $I_2$.

Using the third row K=2, $M_1$=4, $M_2$=4, $N_{CP,S}$=384, and $N_{CP,L}$=384 in Table 1-1 as an example, it may be learned that the reference time unit includes $M_1+M_2$=8 symbols.

As shown in (b) in FIG. 3a, when the second subcarrier spacing is $\Delta f_2$=30 KHz, the first time unit includes 16 symbols, and the 16 symbols may be two repetitions of eight symbols included in the reference time unit. The symbol location of the first subcarrier spacing and the symbol location of the second subcarrier spacing in the 16 symbols may be determined based on the symbol location of the first subcarrier spacing in the reference time unit and the symbol location of the second subcarrier spacing in the reference time unit. For example, if the symbol location of the first subcarrier spacing in the reference time unit is {0, 2, 4, 6}, and the symbol location of the second subcarrier spacing is {1, 3, 5, 7}, the symbol location of the first subcarrier spacing in the first time unit in (b) in FIG. 3a is {0, 2, 4, 6, 8, 10, 12, 14}, and the symbol location of the second subcarrier spacing is {1, 3, 5, 7, 9, 11, 13, 15}.

In conclusion, for different values of the second subcarrier spacing $\Delta f_2$, determined CP lengths of the symbols corresponding to the first subcarrier spacing are different, and determined CP lengths of the symbols corresponding to the second subcarrier spacing are different.

The value of the CP determined by using the method in this application can ensure that for different values of the second subcarrier spacing $\Delta f_2$, the determined CP length of the symbol corresponding to the first subcarrier spacing is still a positive integer in various system bandwidths. In other words, a quantity of discrete sampling points obtained by sampling the CP at each interval $T_2$ is a positive integer, so that the terminal device can generate a symbol with low complexity, and this avoids a process in which an additional processing manner like upsampling is required to generate a symbol because the CP length is not a positive integer.

In this application, when the value of the CP length is determined, it is designed to ensure that CP lengths of different symbols are as consistent as possible, and ensure that in various system bandwidths, the CP length is still a positive integer when being increased or reduced proportionally with different values of the second subcarrier spacing. It is ensured that CP lengths of different symbols are consistent as much as possible, to resolve a problem that when CP lengths are inconsistent, a shorter CP causes inter-symbol interference after passing through a multipath channel. It is ensured that the CP length is still a positive integer when the CP length is correspondingly increased or reduced proportionally with different values of the second subcarrier spacing. As described above, complexity of generating a system can be reduced.

In an example, the terminal device sends the reference signal in a symbol of the first subcarrier spacing, and sends the data in a symbol of the second subcarrier spacing.

In another example, when the quantity of symbols in the first subcarrier spacing is greater than 1, the terminal device sends the reference signal on some symbols in the symbols in the first subcarrier spacing, sends the data on the remaining symbols in the symbols in the first subcarrier spacing, and sends the data on the symbols in the second subcarrier spacing.

Specifically, when the quantity of symbols in the first subcarrier spacing in the reference time unit is greater than 1, some symbols in the symbols in the first subcarrier spacing are used to send a reference signal, and a remaining symbol is used to send data.

For example, $M_{rs}$ symbols in the reference time unit are used to send a reference signal, and $M_1-M_{rs}$ remaining symbols are used to send data. $M_{rs}<M_1$ and $M_1>1$. Locations of $M_{rs}$ symbols in the reference time unit may be predefined, or may be indicated by using RRC signaling. For example, locations of $M_1$ symbols in the reference time unit are 0 to $M_1-1$. It may be predefined that a symbol at an even-numbered location is used to send a reference signal, and a symbol at an odd-numbered location is used to send data.

Figure 3B:
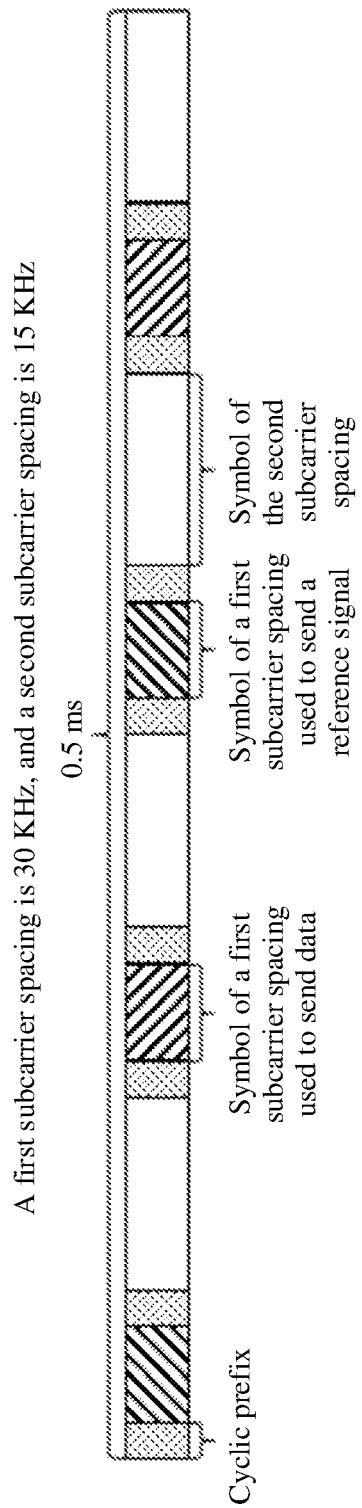
FIG. 3b is a schematic diagram of locations of an example reference signal and data according to an embodiment of this application.

For example, in Table 1-1 K=2, $M_1$=4, $M_2$=4, $N_{CP,S}$=384, and $N_{CP,L}$=384, the reference time unit includes eight symbols. As shown in FIG. 3b, the first subcarrier spacing determined by the terminal device in FIG. 3b is $\Delta f_1$=30 KHz, the second subcarrier spacing is $\Delta f_2$=15 KHz, and the time unit is 0.5 ms. In this case, the duration of the first time unit determined by the terminal device is consistent with the duration of the reference time unit. In the four symbols at the first subcarrier spacing in FIG. 3b, symbols at the $1^{st}$ and $3^{rd}$ first subcarrier spacings are used to send reference signals, and symbols at a $2^{nd}$ and $4^{th}$ first subcarrier spacings are used to send reference signals.

The reference signals are sent on some symbols in the symbols in the first subcarrier spacing, the data is sent on the remaining symbols in the symbols in the first subcarrier spacing, and the data is sent on the symbols in the second subcarrier spacing. In this way, overheads of the reference signal can be more flexibly controlled, thereby improving spectral efficiency.

The foregoing describes the method in embodiments of this application, and the following describes an apparatus in embodiments of this application. The method and the apparatus are based on a same technical idea. The method and the apparatus have similar principles for resolving problems. Therefore, for implementations of the apparatus and the method, refer to each other. Details are not repeated herein.

In embodiments of this application, the apparatus may be divided into functional modules based on the foregoing method examples. For example, the apparatus may be divided into functional modules corresponding to functions, or two or more functions may be integrated into one module. These modules may be implemented in a form of hardware, or may be implemented in a form of a software functional module. It is to be noted that, in embodiments of this application, module division is an example, and is merely a logical function division. In a specific implementation, another division manner may be used.

Figure 4:
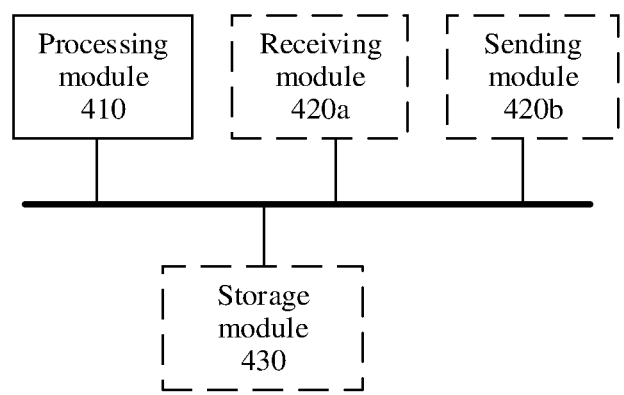
FIG. 4 is a schematic diagram of a structure of an example communication apparatus according to an embodiment of this application.

Based on the same technical concept as the foregoing method, FIG. 4 is a schematic diagram of a structure of an example communication apparatus 400. The apparatus 400 may include a processing module 410, and optionally, further includes a receiving module 420a, a sending module 420b, and a storage module 430. The processing module 410 may be separately connected to the storage module 430, the receiving module 420a, and the sending module 420b, and the storage module 430 may also be connected to the receiving module 420a and the sending module 420b.

In an example, the receiving module 420a and the sending module 420b may alternatively be integrated, and are defined as a transceiver module.

In an example, the apparatus 400 may be a first device, or may be a chip or a functional unit applied to a first device. The apparatus 400 has any function of the first device in the foregoing method. For example, the apparatus 400 can perform steps performed by the first device in the method in FIG. 2.

The receiving module 420a may perform a receiving action performed by the first device in the foregoing method embodiments.

The sending module 420b may perform a sending action performed by the first device in the foregoing method embodiments.

The processing module 410 may perform another action other than the sending action and the receiving action in the actions performed by the first device in the foregoing method embodiments.

In an example, the processing module 410 is configured to determine a first subcarrier spacing, a second subcarrier spacing, a cyclic prefix (CP) length of a first symbol, and a CP length of a second symbol, where the first subcarrier spacing is K times the second subcarrier spacing, K is an integer greater than 1, and the CP length of the first symbol is greater than or equal to the CP length of the second symbol.

The sending module 420b is configured to: send a reference signal based on the CP length of the first symbol and the first subcarrier spacing, and send data based on the CP length of the second symbol and the second subcarrier spacing; or send a reference signal based on the CP length of the second symbol and the first subcarrier spacing, and send data based on the CP length of the first symbol, the CP length of the second symbol, and the second subcarrier spacing.

In an example, the processing module 410 is specifically configured to select a first correspondence from a table, where the table includes a plurality of correspondences of parameter information, and parameter information in any correspondence includes a ratio K of the first subcarrier spacing to the second subcarrier spacing, a CP length of the first symbol in the reference time unit, and a CP length of the second symbol in the reference time unit; and for any correspondence, K is an integer greater than 1, and the CP length of the first symbol is greater than or equal to the CP length of the second symbol.

In an example, the sending module 420b is further configured to send data based on the first subcarrier spacing.

In an example, the sending module 420b is configured to: send the reference signal based on the CP length of the first symbol and the first subcarrier spacing, and send the data based on the CP length of the second symbol and the second subcarrier spacing, and is further configured to send the reference signal based on the CP length of the second symbol and the first subcarrier spacing.

In an example, the receiving module 420a is configured to receive indication information, where the indication information indicates the first correspondence.

In an example, the storage module 430 may store a computer-executable instruction of the method performed by the first device, so that the processing module 410, the receiving module 420a, and the sending module 420b perform the method performed by the first device in the foregoing example.

For example, the storage module may include one or more memories. The memory may be one or more devices or components in a circuit that are used to store a program or data. The storage module may be a register, a cache, a RAM, or the like. The storage module may be integrated with the processing module. The storage module may be a ROM or another type of static storage device that can store static information and instructions. The storage module may be independent of the processing module.

The transceiver module may be an input/output interface, a pin, a circuit, or the like.

As a possible product form, the apparatus may be implemented using a general bus architecture.

Figure 5:
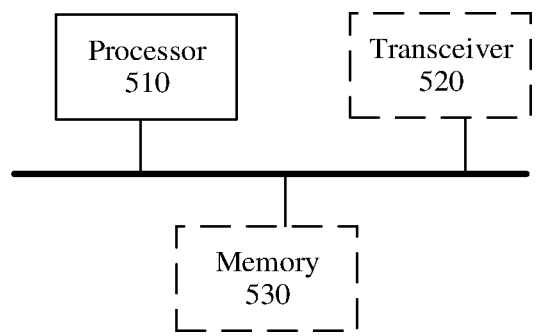
FIG. 5 is a schematic diagram of a structure of an example communication apparatus according to an embodiment of this application.

As shown in FIG. 5, FIG. 5 is a schematic block diagram of an example communication apparatus 500.

The apparatus 500 may include a processor 510. Optionally, the apparatus 500 further includes a transceiver 520 and a memory 530. The transceiver 520 may be configured to receive a program or instructions and transmit the program or the instructions to the processor 510. Alternatively, the transceiver 520 may be configured to perform communication interaction between the apparatus 500 and another communication device, for example, exchange control signaling and/or service data. The transceiver 520 may be a code and/or data read/write transceiver, or the transceiver 520 may be a signal transmission transceiver between the processor and the transceiver. The processor 510 and the memory 530 are electrically coupled.

In an example, the apparatus 500 may be a first device, or may be a chip applied to a first device. It should be understood that the apparatus has any function of the first device in the foregoing method. For example, the apparatus 500 can perform steps performed by the first device in the method in FIG. 2. For example, the memory 530 is configured to store a computer program. The processor 510 may be configured to invoke the computer program or the instructions stored in the memory 530, to perform the method performed by the first device in the foregoing example, or perform, by using the transceiver 520, the method performed by the first device in the foregoing example.

As a possible product form, the apparatus may be implemented by a general-purpose processor (the general-purpose processor is also referred to as a chip or a chip system).

In a possible implementation, a general-purpose processor that implements the apparatus used on the first device includes: a processing circuit (also referred to as a processor); and optionally, further includes: an input/output interface and a storage medium (also referred to as a memory) that are connected to and communicate with the processing circuit. The storage medium is configured to store instructions executed by the processing circuit, to perform the method executed by the first device in the foregoing example.

The processing module 410 in FIG. 4 may be implemented by using the processing circuit.

The receiving module 420a and the sending module 420b in FIG. 4 may be implemented by using the input/output interface. Alternatively, the input/output interface includes an input interface and an output interface. The input interface performs a function of the receiving module, and the output interface performs a function of the sending module.

The storage module 430 in FIG. 4 may be implemented by using the storage medium.

As a possible product form, the apparatus in embodiments of this application may be further implemented by using one or more FPGAs (field-programmable gate arrays), a PLD (programmable logic device), a controller, a state machine, a gate logic, a discrete hardware component, any other proper circuit, or any combination of circuits that can perform various functions described in this application.

An embodiment of this application further provides a computer-readable storage medium that stores a computer program. When the computer program is executed by a computer, the computer may be enabled to perform the foregoing communication method. In other words, the computer program includes instructions for implementing the foregoing communication method.

An embodiment of this application further provides a computer program product. The computer program product includes computer program code. When the computer program code is run on a computer, the computer is enabled to perform the foregoing communication method.

An embodiment of this application further provides a communication system. The communication system includes a terminal device and a network device that perform the foregoing communication method.

In addition, the processor mentioned in embodiments of this application may be a central processing unit (CPU) or a baseband processor. The baseband processor and the CPU may be integrated or separated, or may be a network processor (NP) or a combination of a CPU and an NP. The processor may further include a hardware chip or another general-purpose processor. The hardware chip may be an application-specific integrated circuit (ASIC), a programmable logic device (PLD), or a combination thereof. The PLD may be a complex programmable logic device (CPLD), a field programmable gate array (FPGA), a generic array logic (GAL) and another programmable logic device, a discrete gate or a transistor logic device, a discrete hardware component, or the like, or any combination thereof. The general-purpose processor may be a microprocessor, or the processor may be any conventional processor or the like.

The memory mentioned in embodiments of this application may be a volatile memory or a nonvolatile memory, or may include a volatile memory and a non-volatile memory. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. Through example but not limitative descriptions, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It is to be noted that the memory described in this application aims to include but is not limited to these memories and any memory of another proper type.

The transceiver mentioned in embodiments of this application may include a separate transmitter and/or a separate receiver, or the transmitter and the receiver may be integrated. The transceiver may operate according to an instruction of a corresponding processor. Optionally, the transmitter may correspond to a transmitter machine in a physical device, and the receiver may correspond to a receiver machine in the physical device.

A person of ordinary skill in the art may be aware that, in combination with the examples described in embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of embodiments in this application.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions in this application essentially, or the part contributing to the conventional technology, or all or some of the technical solutions may be represented in a form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes: any medium that can store program code, like a USB flash drive, a removable hard disk, a read-only memory (ROM), a random access memory (RAM), a magnetic disk, or an optical disc.

The term "and/or" in this application describes an association relationship for describing associated objects and represents that any one of three relationships may exist. For example, A and/or B may represent any one of three cases: Only A exists, both A and B exist, or only B exists. The character "/" generally indicates an "or" relationship between the associated objects. "A plurality of" in this application means two or more. In addition, it should be understood that in description of this application, terms such as "first" and "second" are merely used for distinguishing and description, but should not be understood as indicating or implying relative importance, or should not be understood as indicating or implying a sequence.

Although some embodiments of this application have been described, a person skilled in the art can make changes and modifications to these embodiments once they learn the basic inventive concept. Therefore, the following claims are intended to be construed as to cover the preferred embodiments and all changes and modifications falling within the scope of this application.

Clearly, a person skilled in the art can make various modifications and variations to embodiments of this application without departing from the spirit and scope of embodiments of this application. In this way, this application is intended to cover these modifications and variations to embodiments of this application provided that they fall within the scope of protection defined by the following claims and their equivalent technologies of this application.

What is claimed is:

1. A communication method, comprising:
   determining a first subcarrier spacing, a second subcarrier spacing, a cyclic prefix (CP) length of a first symbol, and a CP length of a second symbol, wherein the first subcarrier spacing is K times the second subcarrier spacing, K is an integer greater than 1, and the CP length of the first symbol is greater than or equal to the CP length of the second symbol; and
   sending a reference signal based on the CP length of the first symbol and the first subcarrier spacing, and sending data based on the CP length of the second symbol and the second subcarrier spacing; or sending a reference signal based on the CP length of the second symbol and the first subcarrier spacing, and sending data based on the CP length of the first symbol, the CP length of the second symbol, and the second subcarrier spacing.

2. The method according to claim 1, wherein the determining of the first subcarrier spacing, the second subcarrier spacing, the cyclic prefix (CP) length of the first symbol, and the CP length of the second symbol comprises:
   selecting a first correspondence from a table, wherein the table comprises a plurality of correspondences of parameter information, and parameter information in each of the plurality of correspondences comprises a ratio K of the first subcarrier spacing to the second subcarrier spacing, the CP length of the first symbol in a reference time unit, and the CP length of the second symbol in the reference time unit, and
   for each of the plurality of correspondences, K is an integer greater than 1, and the CP length of the first symbol is greater than or equal to the CP length of the second symbol.

3. The method according to claim 2, wherein the parameter information in each of the plurality of correspondences further comprises:
   a quantity M1 of symbols corresponding to the first subcarrier spacing in the reference time unit, and a quantity M2 of symbols corresponding to the second subcarrier spacing in the reference time unit.

4. The method according to claim 3, wherein, for each of the plurality of correspondences, the quantity M1 of symbols corresponding to the first subcarrier spacing is less than or equal to the quantity M2 of symbols corresponding to the second subcarrier spacing.

5. The method according to claim 2, wherein for at least one value of K, the table comprises at least two correspondences.

6. The method according to claim 2, wherein, when $$T_{unit,ref} = \frac{7.5}{\Delta f_2} \cdot \tau$$

and $N_2$ 2048·ρ, $T_{unit,ref}$ is a duration of the reference time unit, $\Delta f_2$ is the second subcarrier spacing, $N_2$ is a length of a symbol corresponding to the second subcarrier spacing, both τ and ρ are greater than 0, and the plurality of correspondences comprise:
   when K=2, M1=2τ, and M2=6τ, CP lengths of the first symbol and the second symbol are 128ρ;
   when K=2, M1=3τ, and M2=5τ, CP lengths of the first symbol and the second symbol are 256ρ;
   when K=2, M1=4τ, and M2=4τ, CP lengths of the first symbol and the second symbol are 384ρ;
   when K=4, M1=2τ, and M2=6τ, CP lengths of the first symbol and the second symbol are 256ρ;
   when K=4, M1=5τ, and M2=5τ, CP lengths of the first symbol and the second symbol are 256ρ;
   when K=8, M1=2τ, and M2=6τ, CP lengths of the first symbol and the second symbol are 320ρ;
   when K=8, M1=3τ, and M2=6τ, CP lengths of the first symbol and the second symbol are 256ρ; and/or
   when K=8, M1=6τ, and M2=6τ, CP lengths of the first symbol and the second symbol are 128ρ.

7. The method according to claim 2, wherein, when $$T_{unit,ref} = \frac{7.5}{\Delta f_2} \cdot \tau$$

and $N_2$=2048·ρ, $T_{unit,ref}$ is a duration of the reference time unit, $\Delta f_2$ is the second subcarrier spacing, $N_2$ is a length of a symbol corresponding to the second subcarrier spacing, both T and p are greater than 0, and the plurality of correspondences comprise:
   when K=2, M1=4τ, and M2=5τ, the CP length of the first symbol is 128ρ and the CP length of the second symbol is 112ρ;
   when K=4, M1=3τ, and M2=6τ, the CP length of the first symbol is 256ρ and the CP length of the second symbol is 160ρ;
   when K=4, M1=3τ, and M2=6τ, the CP length of the first symbol is 192ρ and the CP length of the second symbol is 168ρ;
   when K=4, M1=4τ, and M2=6τ, the CP length of the first symbol is 160ρ and the CP length of the second symbol is 96ρ;
   when K=4, M1=4τ, and M2=6τ, the CP length of the first symbol is 124ρ and the CP length of the second symbol is 100ρ;
   when K=8, M1=4τ, and M2=6τ, the CP length of the first symbol is 248ρ and the CP length of the second symbol is 200ρ; and/r when K=8, M1=4τ, and M2=6τ, the CP length of the first symbol is 212ρ and the CP length of the second symbol is 204ρ.

8. The method according to claim 2, wherein, when $$T_{unit,ref} = \frac{7.5}{\Delta f_2} \cdot \tau$$

and $N_2=2048 \cdot \rho$, $T_{unit,ref}$ is a duration of the reference time unit, $\Delta f_2$ is the second subcarrier spacing, $N_2$ is a length of a symbol corresponding to the second subcarrier spacing, both T and p are greater than 0, and the plurality of correspondences comprise:

when K=2, M1=2τ, and M2=6τ, the CP length of the first symbol is 176ρ and the CP length of the second symbol is 112ρ;

when K=2, M1=2τ, and M2=6τ, the CP length of the first symbol is 152ρ and the CP length of the second symbol is 120ρ;

when K=2, M1=4τ, and M2=5τ, the CP length of the first symbol is 136ρ and the CP length of the second symbol is 96ρ;

when K=2, M1=4τ, and M2=5τ, the CP length of the first symbol is 116ρ and the CP length of the second symbol is 112ρ;

when K=4, M1=3τ, and M2=6τ, the CP length of the first symbol is 192ρ and the CP length of the second symbol is 160ρ;

when K=4, M1=4τ, and M2=6τ, the CP length of the first symbol is 112ρ and the CP length of the second symbol is 96ρ;

when K=8, M1=4τ, and M2=6τ, the CP length of the first symbol is 224ρ and the CP length of the second symbol is 192ρ; and/or when K=8, M1=6τ, and M2=6τ, the CP length of the first symbol is 144ρ and the CP length of the second symbol is 112ρ.

9. The method according to claim 1, further comprising: sending the data based on the first subcarrier spacing.

10. The method according to claim 1, wherein the sending of the reference signal based on the CP length of the first symbol and the first subcarrier spacing, and the sending of data based on the CP length of the second symbol and the second subcarrier spacing further comprises:

sending the reference signal based on the CP length of the second symbol and the first subcarrier spacing.

11. A communication apparatus, comprising:
at least one processor; and
a non-transitory computer-readable medium including computer-executable instructions that, when executed by the processor, cause the apparatus to perform operations including:
determining a first subcarrier spacing, a second subcarrier spacing, a cyclic prefix (CP) length of a first symbol, and a CP length of a second symbol, wherein the first subcarrier spacing is K times the second subcarrier spacing, K is an integer greater than 1, and the CP length of the first symbol is greater than or equal to the CP length of the second symbol; and
sending a reference signal based on the CP length of the first symbol and the first subcarrier spacing, and sending data based on the CP length of the second symbol and the second subcarrier spacing; or sending a reference signal based on the CP length of the second symbol and the first subcarrier spacing, and sending data based on the CP length of the first symbol, the CP length of the second symbol, and the second subcarrier spacing.

12. The communication apparatus according to claim 11, wherein the determining of the first subcarrier spacing, the second subcarrier spacing, the cyclic prefix (CP) length of the first symbol, and the CP length of the second symbol comprises:

selecting a first correspondence from a table, wherein the table comprises a plurality of correspondences of parameter information, and parameter information in any each of the plurality of correspondences comprises a ratio K of the first subcarrier spacing to the second subcarrier spacing, the CP length of the first symbol in a reference time unit, and the CP length of the second symbol in the reference time unit, and for each of the plurality of correspondences, K is an integer greater than 1, and the CP length of the first symbol is greater than or equal to the CP length of the second symbol.

13. The communication apparatus according to claim 12, wherein the parameter information in each of the plurality of correspondences further comprises:

a quantity M1 of symbols corresponding to the first subcarrier spacing in the reference time unit, and a quantity M2 of symbols corresponding to the second subcarrier spacing in the reference time unit.

14. The communication apparatus according to claim 13, wherein for each of the plurality of correspondences, the quantity M1 of symbols corresponding to the first subcarrier spacing is less than or equal to the quantity M2 of symbols corresponding to the second subcarrier spacing.

15. The communication apparatus according to claim 12, wherein, for at least one value of K, the table comprises at least two correspondences.

16. The communication apparatus according to claim 12, wherein, when $$T_{unit,ref} = \frac{7.5}{\Delta f_2} \cdot \tau$$

and $N_2=2048 \cdot \rho$, $T_{unit,ref}$ is a duration of the reference time unit, $\Delta f_2$ is the second subcarrier spacing, $N_2$ is a length of a symbol corresponding to the second subcarrier spacing, both T and p are greater than 0, and the plurality of correspondences comprise:

when K=2, M1=2τ, and M2=6τ, CP lengths of the first symbol and the second symbol are 128ρ;

when K=2, M1=3τ, and M2=5τ, CP lengths of the first symbol and the second symbol are 256ρ;

when K=2, M1=4τ, and M2=4τ, CP lengths of the first symbol and the second symbol are 384ρ;

when K=4, M1=2τ, and M2=6τ, CP lengths of the first symbol and the second symbol are 256ρ;

when K=4, M1=5τ, and M2=5τ, CP lengths of the first symbol and the second symbol are 256ρ;

when K=8, M1=2τ, and M2=6τ, CP lengths of the first symbol and the second symbol are 320ρ;

when K=8, M1=3τ, and M2=6τ, CP lengths of the first symbol and the second symbol are 256ρ; and/or when K=8, M1=6τ, and M2=6τ, CP lengths of the first symbol and the second symbol are 128ρ.

17. The communication apparatus according to claim 12, wherein, when $$T_{unit,ref} = \frac{7.5}{\Delta f_2} \cdot \tau$$

and $N_2=2048 \cdot \rho$, $T_{unit,ref}$ is a duration of the reference time unit, $\Delta f_2$ is the second subcarrier spacing, $N_2$ is a length of a symbol corresponding to the second subcarrier spacing, both τ and ρ are greater than 0, and the plurality of correspondences comprise:

when K=2, M1=4τ, and M2=5τ, the CP length of the first symbol is 128ρ and the CP length of the second symbol is 112ρ;

when K=4, M1=3τ, and M2=6τ, the CP length of the first symbol is 256ρ and the CP length of the second symbol is 160ρ;

when K=4, M1=3τ, and M2=6τ, the CP length of the first symbol is 192ρ and the CP length of the second symbol is 168ρ;

when K=4, M1=4τ, and M2=6τ, the CP length of the first symbol is 160ρ and the CP length of the second symbol is 96ρ;

when K=4, M1=4τ, and M2=6τ, the CP length of the first symbol is 124ρ and the CP length of the second symbol is 100ρ;

when K=8, M1=4τ, and M2=6τ, the CP length of the first symbol is 248ρ and the CP length of the second symbol is 200ρ; and/or when K=8, M1=4τ, and M2=6τ, the CP length of the first symbol is 212ρ and the CP length of the second symbol is 204ρ.

18. The communication apparatus according to claim 12, wherein, when $$T_{unit,ref} = \frac{7.5}{\Delta f_2} \cdot \tau$$

and $N_2 = 2048 \cdot \rho$, $T_{unit,ref}$ is a duration of the reference time unit, $\Delta f_2$ is the second subcarrier spacing, $N_2$ is a length of a symbol corresponding to the second subcarrier spacing, both τ and ρ are greater than 0, and the plurality of correspondences comprise:

when K=2, M1=2τ, and M2=6τ, the CP length of the first symbol is 176ρ and the CP length of the second symbol is 112ρ;

when K=2, M1=2τ, and M2=6τ, the CP length of the first symbol is 152ρ and the CP length of the second symbol is 120ρ;

when K=2, M1=4τ, and M2=5τ, the CP length of the first symbol is 136ρ and the CP length of the second symbol is 96ρ;

when K=2, M1=4τ, and M2=5τ, the CP length of the first symbol is 116ρ and the CP length of the second symbol is 112ρ;

when K=4, M1=3τ, and M2=6τ, the CP length of the first symbol is 192ρ and the CP length of the second symbol is 160ρ;

when K=4, M1=4τ, and M2=6τ, the CP length of the first symbol is 112ρ and the CP length of the second symbol is 96ρ;

when K=8, M1=4τ, and M2=6τ, the CP length of the first symbol is 224ρ and the CP length of the second symbol is 192ρ; and/or when K=8, M1=6τ, and M2=6τ, the CP length of the first symbol is 144ρ and the CP length of the second symbol is 112ρ.

19. The communication apparatus according to claim 11, further comprising:

sending the data based on the first subcarrier spacing.

20. The communication apparatus according to claim 11, wherein the sending of the reference signal based on the CP length of the first symbol and the first subcarrier spacing, and sending data based on the CP length of the second symbol and the second subcarrier spacing comprises:

sending the reference signal based on the CP length of the second symbol and the first subcarrier spacing.

* * * * *

UNITED STATES PATENT AND TRADEMARK OFFICE
CERTIFICATE OF CORRECTION

| | | |
|---|---|---|
| PATENT NO. | : 12,413,465 B2 | Page 1 of 1 |
| APPLICATION NO. | : 18/621237 | |
| DATED | : September 9, 2025 | |
| INVENTOR(S) | : Yuanzhou Hu et al. | |

It is certified that error appears in the above-identified patent and that said Letters Patent is hereby corrected as shown below:

In the Specification

Column 2, Line 21, change "1'" to --1st--;

In the Claims

Column 36, Claim 7, Line 58, change "and/r'" to --and/or--;

Column 38, Claim 12, Line 3, change "any each'" to --each--.

Signed and Sealed this
Seventh Day of October, 2025

John A. Squires
*Director of the United States Patent and Trademark Office*